United States Patent
Rangaswamy et al.

(10) Patent No.: US 12,315,330 B2
(45) Date of Patent: May 27, 2025

(54) CHIP TRACKING SYSTEM

(71) Applicant: LNW Gaming, Inc., Las Vegas, NV (US)

(72) Inventors: Suhas Rangaswamy, Karnataka (IN); Prateek Kumar Baishkhiyar, Bengaluru (IN); Yogendrasinh Rajput, Bangalore (IN)

(73) Assignee: LNW Gaming, Inc., Las Vegas, NV (US)

( * ) Notice: Subject to any disclaimer, the term of this patent is extended or adjusted under 35 U.S.C. 154(b) by 166 days.

(21) Appl. No.: 17/836,668

(22) Filed: Jun. 9, 2022

(65) Prior Publication Data
US 2022/0406121 A1 Dec. 22, 2022

Related U.S. Application Data

(60) Provisional application No. 63/212,771, filed on Jun. 21, 2021.

(51) Int. Cl.
*G07F 17/32* (2006.01)
*G06V 10/60* (2022.01)
(Continued)

(52) U.S. Cl.
CPC ............ *G07F 17/322* (2013.01); *G06V 10/60* (2022.01); *G06V 10/82* (2022.01); *G06V 20/52* (2022.01);
(Continued)

(58) Field of Classification Search
CPC .............. G07F 17/322; G07F 17/3232; G07F 17/3234; G07F 17/3241; G07F 17/3248; G06V 10/82
See application file for complete search history.

(56) References Cited

U.S. PATENT DOCUMENTS 3,821,340 A * 6/1974 Marks ................... F16L 55/18
264/45.2
5,103,081 A   4/1992 Fisher et al.
(Continued)

FOREIGN PATENT DOCUMENTS

ES       2301912 T3 *  7/2008  ............... A63F 1/18
RO       128273 A2  *  4/2013
(Continued)

OTHER PUBLICATIONS

US 10,380,841 B2, 08/2019, Shigeta (withdrawn)
"About PLC's," by Dag H. Hanssen, published Sep. 12, 2015. Source: https://doi.org/10.1002/9781118949214.ch1 (Year: 2015).*

*Primary Examiner* — Steven J Hylinski

(57) ABSTRACT

A method and apparatus for a chip tracking system. For example, an apparatus comprises a chip tray and a tracking controller. The chip tray has a plurality of light sensors positioned inside a column. In some instances, the tracking controller is configured to perform operations that cause the apparatus to detect a level of ambient light at each of the plurality of light sensors and determine, in response to detection of the level of ambient light at each of the plurality of light sensors, a number of gaming chips placed inside the column. The tracking controller is further configured to perform operations that cause the apparatus to compute, in response to determination of the number of gaming chips, a chip-column value. In some instances, the tracking controller is further configured to automatically indicate the chip-column value via one or more electronic devices communicatively coupled to the chip tray.

19 Claims, 14 Drawing Sheets

(51) Int. Cl.
  *G06V 10/82*    (2022.01)
  *G06V 20/52*    (2022.01)
  *G06V 20/64*    (2022.01)

(52) U.S. Cl.
  CPC .......... *G06V 20/64* (2022.01); *G07F 17/3241* (2013.01)

(56) References Cited

U.S. PATENT DOCUMENTS

| | | |
|---|---|---|
| 5,451,054 A | 9/1995 | Orenstein |
| 5,757,876 A | 5/1998 | Dam et al. |
| 6,460,848 B1 | 10/2002 | Soltys et al. |
| 6,514,140 B1 | 2/2003 | Storch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,533,662 B2 | 3/2003 | Soltys et al. |
| 6,579,180 B2 | 6/2003 | Soltys et al. |
| 6,579,181 B2 | 6/2003 | Soltys et al. |
| 6,663,490 B2 | 12/2003 | Soltys et al. |
| 6,688,979 B2 | 2/2004 | Soltys et al. |
| 6,712,696 B2 | 3/2004 | Soltys et al. |
| 6,758,751 B2 | 7/2004 | Soltys et al. |
| 7,124,947 B2 | 10/2006 | Storch |
| 7,316,615 B2 | 1/2008 | Soltys et al. |
| 7,753,781 B2 | 7/2010 | Storch |
| 7,771,272 B2 | 8/2010 | Soltys et al. |
| 8,130,097 B2 | 3/2012 | Knust et al. |
| 8,285,034 B2 | 10/2012 | Rajaraman et al. |
| 8,606,002 B2 | 12/2013 | Rajaraman et al. |
| 9,378,605 B2 | 6/2016 | Koyama |
| 9,779,582 B1 | 10/2017 | Ben Hanan et al. |
| 9,795,870 B2 | 10/2017 | Ratliff |
| 10,032,335 B2 | 7/2018 | Shigeta |
| 10,096,206 B2 | 10/2018 | Bulzacki et al. |
| 10,192,085 B2 | 1/2019 | Shigeta |
| 10,398,202 B2 | 9/2019 | Shigeta |
| 10,403,090 B2 | 9/2019 | Shigeta |
| 10,529,183 B2 | 1/2020 | Shigeta |
| 10,540,846 B2 | 1/2020 | Shigeta |
| 10,580,254 B2 | 3/2020 | Shigeta |
| 10,593,154 B2 | 3/2020 | Shigeta |
| 10,600,279 B2 | 3/2020 | Shigeta |
| 10,600,282 B2 | 3/2020 | Shigeta |
| 10,665,054 B2 | 5/2020 | Shigeta |
| 10,720,013 B2 | 7/2020 | Main, Jr. |
| 11,030,855 B1 | 6/2021 | Halsey et al. |
| 11,676,445 B2 | 6/2023 | Gelinotte et al. |
| 11,948,421 B2 | 4/2024 | Bulzacki et al. |
| 11,967,200 B2 | 4/2024 | Lyons et al. |
| 2002/0042298 A1 | 4/2002 | Soltys et al. |
| 2005/0059479 A1 | 3/2005 | Soltys et al. |
| 2006/0019739 A1 | 1/2006 | Soltys et al. |
| 2018/0061178 A1 | 3/2018 | Shigeta |
| 2018/0068525 A1 | 3/2018 | Shigeta |
| 2018/0075698 A1 | 3/2018 | Shigeta |
| 2018/0114406 A1 | 4/2018 | Shigeta |
| 2018/0211110 A1 | 7/2018 | Shigeta |
| 2018/0239984 A1 | 8/2018 | Shigeta |
| 2018/0247134 A1 | 8/2018 | Bulzacki et al. |
| 2018/0336757 A1 | 11/2018 | Shigeta |
| 2018/0350191 A1 | 12/2018 | Shigeta |
| 2019/0043309 A1 | 2/2019 | Shigeta |
| 2019/0088082 A1 | 3/2019 | Shigeta |
| 2019/0102987 A1 | 4/2019 | Shigeta |
| 2019/0108710 A1 | 4/2019 | French et al. |
| 2019/0147689 A1 | 5/2019 | Shigeta |
| 2019/0172312 A1 | 6/2019 | Shigeta |
| 2019/0213830 A1 | 7/2019 | Main, Jr. |
| 2019/0236891 A1 | 8/2019 | Shigeta |
| 2019/0259238 A1 | 8/2019 | Shigeta |
| 2019/0266832 A1 | 8/2019 | Shigeta |
| 2019/0347893 A1 | 11/2019 | Shigeta |
| 2019/0362594 A1 | 11/2019 | Shigeta |
| 2019/0371112 A1 | 12/2019 | Shigeta |
| 2023/0032920 A1* | 2/2023 | Bulzacki .......... G08B 13/19613 |

FOREIGN PATENT DOCUMENTS

| | | |
|---|---|---|
| RO | 131620 A2 * | 1/2017 |
| WO | 2017197452 A1 | 11/2017 |
| WO | 2018047965 A1 | 3/2018 |
| WO | 2020068141 A1 | 4/2020 |

\* cited by examiner

CHIP TRACKING SYSTEM

CROSS-REFERENCE TO RELATED APPLICATION

This application claims the priority benefit of U.S. Provisional Patent Application No. 63/212,771 filed Jun. 21, 2021, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022 LNW Gaming, Inc.

FIELD OF THE INVENTION

The present invention relates generally to gaming systems, apparatus, and methods and, more particularly, to tracking of physical objects in a gaming environment.

BACKGROUND

Casino gaming environments are dynamic environments in which people, such as players, casino patrons, casino staff, etc., take actions that affect the state of the gaming environment, the state of players, etc. For example, a player may use one or more physical tokens to place wagers on the wagering game. A player may perform hand gestures to perform gaming actions and/or to communicate instructions during a game, such as making gestures to hit, stand, fold, etc. Further, a player may move physical cards, dice, gaming props, etc. A multitude of other actions and events may occur at any given time. To effectively manage such a dynamic environment, the casino operators may employ one or more tracking systems or techniques to monitor aspects of the casino gaming environment, such as credit balance, player account information, player movements, game play events, and the like.

However, one challenge to such tracking systems is tracking the complexity of the system elements, particularly regarding the tracking of money. For example, multiple cameras at, or around, a gaming table may take pictures of casino tokens (e.g., casino chips) at a gaming table from different perspectives (i.e., from the perspective of the camera lenses). A computer then analyses the images to detect the differences between visible features of objects in the images. However, certain image characteristics (e.g., colors, object outlines, etc.) can appear different from image to image based on slight differences in environmental lighting and/or based on in changes of perspective of the cameras used to take the images of the objects. Consequently, some contemporary systems fail to identify some objects. Others require significant computing resources to capture highly detailed images of chips sufficient to identify the visible features needed to determine chip values.

Accordingly, a new tracking system that is adaptable to the challenges of dynamic casino gaming environments is desired.

SUMMARY

According to one aspect of the present disclosure, an apparatus is provided for chip tracking. For example, the apparatus includes a chip tray and a tracking controller. The chip tray has a plurality of light sensors positioned inside a column. In some instances, the tracking controller is configured to perform operations that cause the apparatus to detect a level of ambient light at each of the plurality of light sensors and determine, in response to detection of the level of ambient light at each of the plurality of light sensors, a number of gaming chips placed inside the column. The tracking controller is further configured to perform operations that cause the apparatus to compute, in response to determination of the number of gaming chips, a chip-column value. In some instances, the tracking controller is configured to perform operations that cause the apparatus to automatically indicate the chip-column value via one or more electronic devices communicatively coupled to the chip tray.

Additional aspects of the invention will be apparent to those of ordinary skill in the art in view of the detailed description of various embodiments, which is made with reference to the drawings, a brief description of which is provided below.

Figure 1:
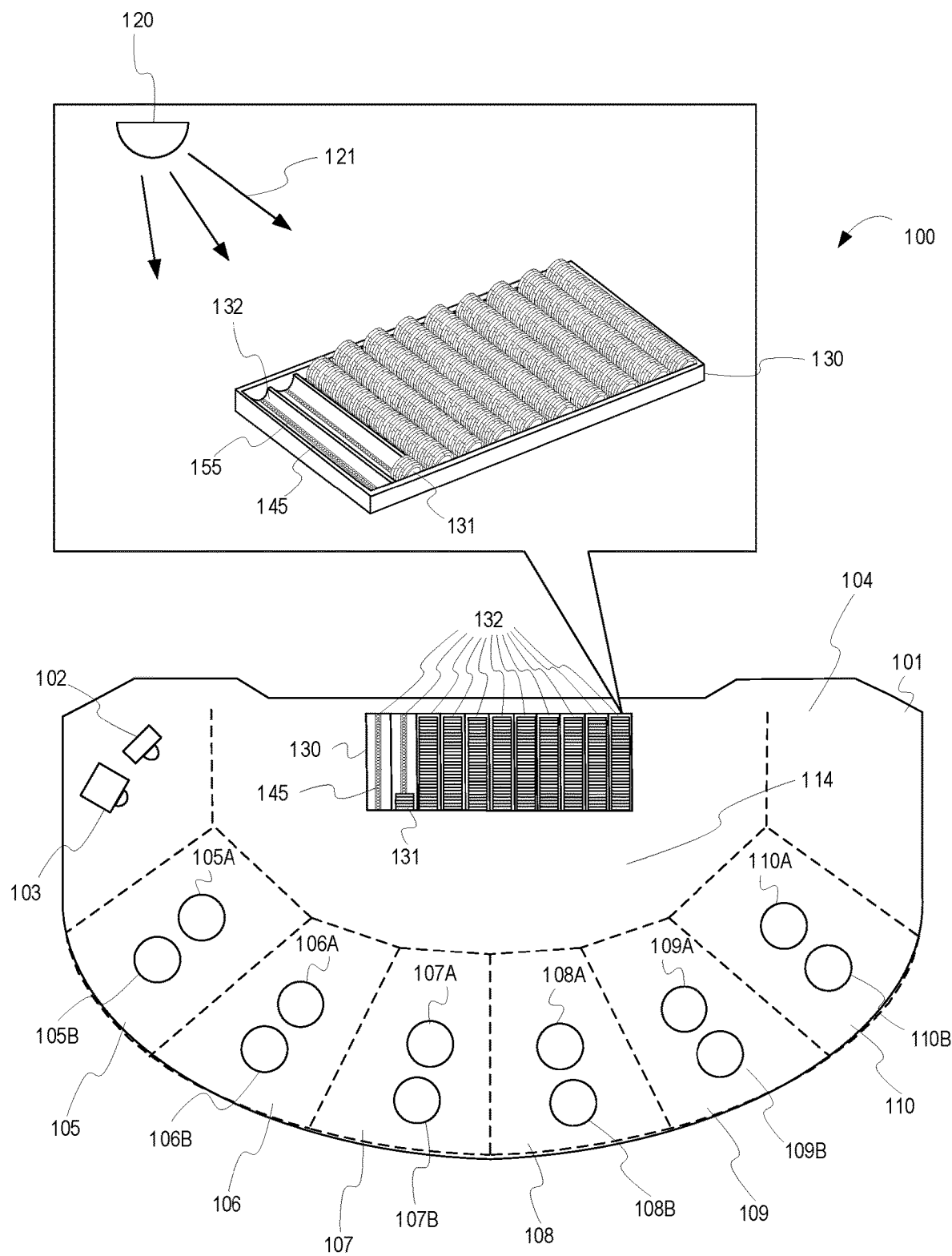
FIG. 1 is a diagram of an example gaming system with a chip tray according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

FIG. 1 is a diagram of an example gaming system 100 with a light-tracking chip tray according to one or more embodiments of the present disclosure. The gaming system 100 includes an overhead view of a gaming table 101 and a light-tracking, chip tray (e.g., chip tray 130). The chip tray 130 can hold gaming tokens, such as gaming chips ("chips 131"), tiles, etc., which a dealer can use to exchange a player's money for physical gaming tokens. The chips 131 rest within one or more vertical, semi-cylindrical slots or columns (e.g., columns 132) of the chip tray 130. Each of the columns 132 has a separate sensor array 145. Each sensor array 145 has a plurality of light sensors 155 positioned inside the columns 132 such that when any one of the chips 131 is placed inside the column 132, the edge of the chip physically covers one of the light sensors 155. When one of the chips 131 covers one of the light sensors 155, it prevents ambient light 121 from reaching the blocked one of the light sensors 155. The ambient light 121 comes from one or more light sources 120 from the gaming environment at, or around, around the gaming table 101. Examples of light sources 120 from the gaming environment may include overhead lighting, effects lighting, signage, attract lighting, emotive lighting, game display lighting, light projected from a projector 103, etc. The light sensors 155 are photoelectric devices that convert light energy (photons) whether visible or infra-red light into an electrical (electrons) signal. For instance, in one embodiment, the light sensors 155 are light dependent resistors (LDRs). In another embodiment, the light sensors 155 are photodiode-based proximity sensors.

Figure 4A:
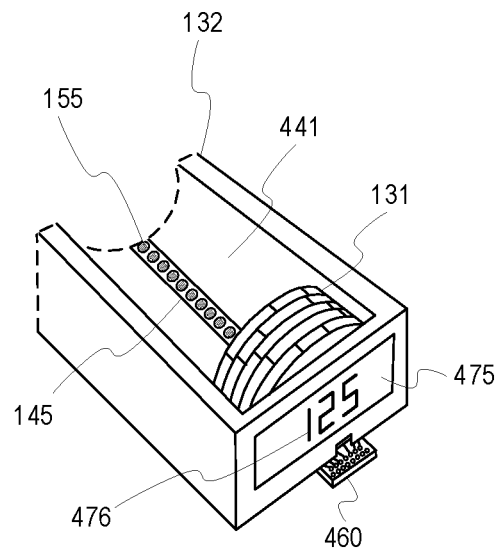
FIGS. 4A, 4B, and 4C are diagrams that illustrate different perspective views of a column of a chip tray according to one or more embodiments of the present disclosure.
Figure 4B:
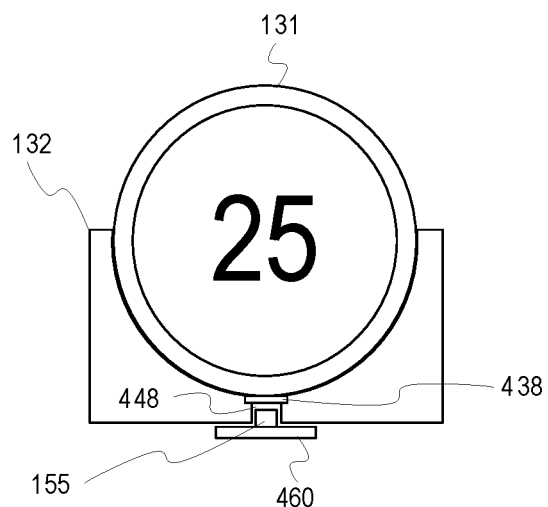
Figure 4C:
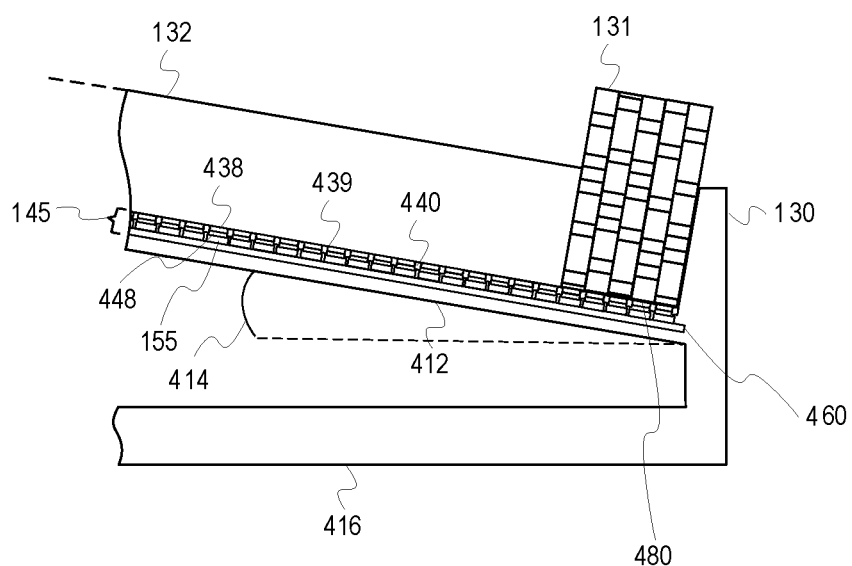

The arrangement of the sensors arrays 145 are shown in the example of FIG. 1 to be aligned vertically along a column 132 and are incorporated with (e.g., affixed to, embedded into, etc.) the physical structure of the chip tray 130, such as at the bottom of the columns 132 (e.g., see FIGS. 4A, 4B, and 4C for more details).

A controller (e.g., tracking controller 204) is configured to electronically track lighting levels of each sensor in the sensor arrays 145 to determine which sensors are blocked by chips 131.

In some embodiments, the gaming system 100 includes a camera 102 and an indicator device that presents data about the chips, such the projector 103, a display, speakers, etc. In some embodiments, the camera 102 captures a stream of images of a gaming area, such as an area encompassing a top surface 104 of the gaming table 101. The projector 103 can also project images of gaming content toward the surface 104 relative to objects in the gaming area. In some embodiments, the projector 103 is configured to project images of gaming content relevant to some elements of a wagering game that are common, or related, to any or all participants (e.g., the projector 103 projects gaming content at a communal presentation area 114). In some instances, the camera 102 is positioned above the surface 104 and to the left of a first player area 105. The camera 102 has a lens that is pointed at the gaming table 101 in a way that views portions of the surface 104 relevant to game play (such as the chip tray 130) and that views game participants (e.g., players, dealer, back-betting patrons, etc.) positioned around the gaming table 101 (at the different player areas 105, 106, 107, 108, 109, and 110). In some embodiments, the camera 102 also views the chip tray 130. The projector 103 is also positioned above the gaming table 101, and also to the left of the first player area 105. In some instances, the tracking controller 204 also analyzes images taken by the camera 102 (or other cameras positioned at the gaming table 101). For example, the tracking controller 204 can perform feature set extraction, object classification, etc. via use of a machine learning model (e.g., a neural network model). The machine learning model is trained to identify chips as objects and classify the chips according to denomination value based on observation of the color patterns on the edges of the chips.

In some embodiments, the tracking controller 204 is also configured to automatically detect physical objects in a gaming environment as points of interest based on electronic analysis of an image performed by one or more additional neural network models. For example, the gaming system 100 can detect one or more points of interest by detecting, via a neural network model, physical features of the image that appear at the surface 104. For example, the tracking controller 204 is configured to monitor the gaming area (e.g., physical objects within the gaming area), and determine a relationship between one or more of the objects. The tracking controller 204 can further receive and analyze collected sensor data (e.g., receives and analyzes the captured image data from the camera 102) to detect and monitor physical objects. The tracking controller 204 can establish data structures relating to various physical objects detected in the image data. For example, the tracking controller 204 can apply one or more image neural network models during image analysis that are trained to detect aspects of physical objects. In at least some embodiments, each model applied by the tracking controller 204 may be configured to identify a particular aspect of the image data and provide different outputs for any physical objected identified such that the tracking controller 204 may aggregate the outputs of the neural network models together to identify physical objects as described herein. The tracking controller 204 may generate data objects for each physical object identified within the captured image data. The data objects may include identifiers that uniquely identify the physical objects such that the data stored within the data objects is tied to the physical objects. The tracking controller 204 can further store data in a database, such as database system 208 in FIG. 2.

In some embodiments, the tracking controller 204 is configured to detect bank-change events, or in other words, events that occur in the gaming environment that would affect a change to the overall value of the bank of chips 131 within the chip tray 130, such as buy-ins, won bets, and pay-outs. For example, the tracking controller 204 identifies betting circles (e.g., main betting circles 105A, 106A, 107A, 108A, 109A, and 110A ("105A-110A") and secondary betting circles 105B, 106B, 107B, 108B, 109B, and 110B ("105B-110B")). The tracking controller 204 also detects placement of gaming chips (e.g., as stacks) within the betting circles during betting on a wagering game conducted at the gaming table 101. The tracking controller 204 can further determine the values of chip stacks within the betting circles. The tracking controller 204 determines, based on the values of the chip stacks, amounts by which the bank is expected to change based on collection of losing bets and/or payouts required for winning bets. The tracking controller 204 can compare the expected amounts to actual changes to the chips 131 in the chip tray 130. Based on the comparison, the tracking controller 204, for instance, determines whether there are any errors in placement of chips of one denomination value into a column for a different denomination value. The tracking controller 204 can further generate warnings (e.g. of the errors of placement of chips in the wrong column) and/or generate reports that tracks the accuracy of a dealer's handling of the chips into and out of the bank.

Some objects may be included at the gaming table 101, such as cards, a card shoe, dice, etc. but are not shown in FIG. 1 for simplicity of description.

Figure 2:
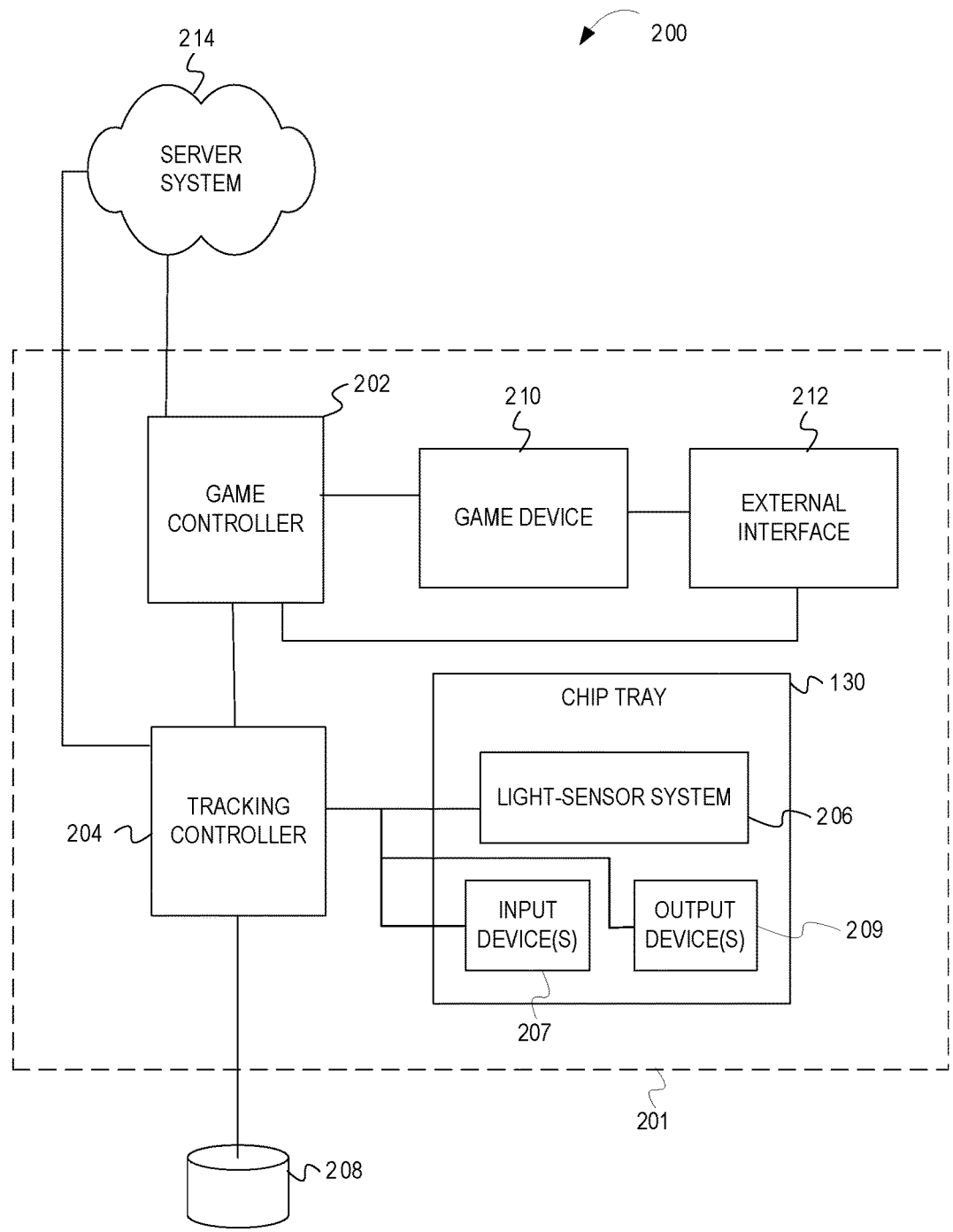
FIG. 2 is an architectural diagram of an exemplary gaming system having a chip tray according to one or more embodiments of the present disclosure.

FIG. 2 is an architectural diagram of an exemplary gaming system 200 having a chip tray, such as chip tray 130, according to one or more embodiments of the present disclosure. In the example embodiment, the gaming system 200 includes a game controller 202, the tracking controller 204, the chip tray 130, and a tracking database system 208. The chip tray 130 includes a light-sensor system 206 configured to track a level of ambient light at various sensor positions with the chip tray 130. In some embodiments, the light-sensor system 206 includes a plurality of light sensors 155 arranged in sensor arrays 145 and affixed to the physical structure of the chip tray 130. In other embodiments, the gaming system 200 may include additional, fewer, or alternative components, including those described elsewhere herein. Furthermore, in some embodiments, the chip tray 130 includes one or more input devices ("input device(s) 207") as well as one or more output devices ("output device(s) 209"). For example, the input devices may include controls (e.g., buttons, a mouse, wireless control devices, etc.) that an operator (e.g., a dealer, a pit boss, etc.) can use to program information, such as column names, denomination values, warning messages, default amounts, etc. In some instances, the output device(s) 209 may include one or more displays, digital read-outs, speakers, etc. (e.g., see electronic displays 475 and/or 575 on the chip tray 130 as described in FIG. 4 and FIG. 5).

The gaming area 201 is an environment in which one or more casino wagering games are provided. In the example embodiment, the gaming area 201 is a casino gaming table and the area surrounding the table (e.g., as in FIG. 1). In other embodiments, other suitable gaming areas 201 may be monitored by the gaming system 200. For example, the gaming area 201 may include one or more floor-standing electronic gaming machines. In another example, multiple gaming tables may be monitored by the gaming system 200. Although the description herein may reference a gaming area (such as gaming area 201) to be a single gaming table and the area surrounding the gaming table, it is to be understood that other gaming areas 201 may be used with the gaming system 200 by employing the same, similar, and/or adapted details as described herein.

The game controller 202 is configured to facilitate, monitor, manage, and/or control gameplay of the one or more games at the gaming area 201. More specifically, the game controller 202 is communicatively coupled to at least one or more of the tracking controller 204, the sensor system 206, the tracking database system 208, a gaming device 210, an external interface 212, and/or a server system 214 to receive, generate, and transmit data relating to the games, the players, the chips 131 and/or the gaming area 201. The game controller 202 may include one or more processors, memory devices, and communication devices to perform the functionality described herein. More specifically, the memory devices store computer-readable instructions that, when executed by the processors, cause the game controller 202 to function as described herein, including communicating with the devices of the gaming system 200 via the communication device(s).

The game controller 202 may be physically located at the gaming area 201 as shown in FIG. 2 or remotely located from the gaming area 201. In certain embodiments, the game controller 202 may be a distributed computing system. That is, several devices may operate together to provide the functionality of the game controller 202. In such embodiments, at least some of the devices (or their functionality) described in FIG. 2 may be incorporated within the distributed game controller 202.

The gaming device 210 is configured to facilitate one or more aspects of a game. For example, for card-based games, the gaming device 210 may be a card shuffler, shoe, or other card-handling device. The external interface 212 is a device that presents information to a player, dealer, or other user and may accept user input to be provided to the game controller 202. In some embodiments, the external interface 212 may be a remote computing device in communication with the game controller 202, such as a player's mobile device. In other examples, the gaming device 210 and/or external interface 212 includes one or more projectors. The server system 214 is configured to provide one or more backend services and/or gameplay services to the game controller 202. For example, the server system 214 may include accounting services to monitor wagers, payouts, and jackpots for the gaming area 201. In another example, the server system 214 is configured to control gameplay by sending gameplay instructions or outcomes to the game controller 202. It is to be understood that the devices described above in communication with the game controller 202 are for exemplary purposes only, and that additional, fewer, or alternative devices may communicate with the game controller 202, including those described elsewhere herein.

In the example embodiment, the tracking controller 204 is in communication with the game controller 202. In other embodiments, the tracking controller 204 is integrated with the game controller 202 such that the game controller 202 provides the functionality of the tracking controller 204 as described herein. Like the game controller 202, the tracking controller 204 may be a single device or a distributed computing system. In one example, the tracking controller 204 may be at least partially located remotely from the gaming area 201. That is, the tracking controller 204 may receive data from one or more devices located at the gaming area 201 (e.g., the game controller 202 and/or the sensor system 206), analyze the received data, and/or transmit data back based on the analysis.

In the example embodiment, the tracking controller 204, similar to the example game controller 202, includes one or more processors, a memory device, and at least one communication device. The memory device is configured to store computer-executable instructions that, when executed by the processor(s), cause the tracking controller 204 to perform the functionality of the tracking controller 204 described herein. The communication device is configured to communicate with external devices and systems using any suitable communication protocols to enable the tracking controller 204 to interact with the external devices and integrates the functionality of the tracking controller 204 with the functionality of the external devices. The tracking controller 204 may include several communication devices to facilitate communication with a variety of external devices using different communication protocols.

The tracking controller 204 is configured to monitor at least one or more aspects of the gaming area 201. In the example embodiment, the tracking controller 204 is configured to monitor physical objects within the area 201, and determine a relationship between one or more of the objects. Some objects may include gaming tokens. The tokens may be any physical object (or set of physical objects) used to place wagers. As used herein, the term "stack" refers to one or more gaming tokens physically grouped together. For circular tokens typically found in casino gaming environments (e.g., gaming chips), these may be grouped together into a vertical stack (e.g., when placed onto a betting spot) or grouped vertically within a column of a chip tray, such as any of the columns 132 of the chip tray 130. In another example in which the tokens are monetary bills and coins, a group of bills and coins may be considered a "stack" based on the physical contact of the group with each other and other factors as described herein.

In the example embodiment, the tracking controller 204 is communicatively coupled to the sensor system 206 to monitor the gaming area 201. More specifically, the sensor system 206 includes one or more sensors configured to collect sensor data associated with the gaming area 201 (e.g., light sensors 155 of the chip tray 130), and the tracking controller 204 receives and analyzes the collected sensor data to detect and monitor physical objects (e.g., chips 131). The sensor system 206 may include any suitable number, type, and/or configuration of sensors to provide sensor data to the game controller 202, the tracking controller 204, and/or another device that may benefit from the sensor data.

In another embodiment, the sensor system 206 includes at least one image sensor that is oriented to capture image data of physical objects in the gaming area 201. In one example, the sensor system 206 may include a single image sensor that monitors the gaming area 201. In another example, the sensor system 206 includes a plurality of image sensors that monitor subdivisions of the gaming area 201. The image sensor may be part of a camera unit of the sensor system 206 or a three-dimensional (3D) camera unit in which the image sensor, in combination with other image sensors and/or other types of sensors, may collect depth data related to the image data, which may be used to distinguish between objects within the image data. The image data is transmitted to the tracking controller 204 for analysis as described herein. In some embodiments, the image sensor is configured to transmit the image data with limited image processing or analysis such that the tracking controller 204 and/or another device receiving the image data performs the image processing and analysis. In other embodiments, the image sensor may perform at least some preliminary image processing and/or analysis prior to transmitting the image data. In such embodiments, the image sensor may be considered an extension of the tracking controller 204, and as such, functionality described herein related to image processing and analysis that is performed by the tracking controller 204 may be performed by the image sensor (or a dedicated computing device of the image sensor). In certain embodiments, the sensor system 206 may include, in addition to or instead of the image sensor, one or more sensors configured to detect objects, such as light sensors, time-of-flight sensors, radar sensors (e.g., LIDAR), thermographic sensors, and the like.

The tracking controller 204 is configured to establish data structures relating to various physical objects detected in the collected data from the sensor(s). For example, the tracking controller 204 applies one or more image neural network models during image analysis that are trained to detect aspects of physical objects. Neural network models are analysis tools that classify "raw" or unclassified input data without requiring user input. That is, in the case of the raw image data captured by the image sensor, the neural network models may be used to translate patterns within the image data to data object representations of, for example, tokens, faces, hands, etc., thereby facilitating data storage and analysis of objects detected in the image data as described herein.

At a simplified level, neural network models are a set of node functions that have a respective weight applied to each function. The node functions and the respective weights are configured to receive some form of raw input data (e.g., image data), establish patterns within the raw input data, and generate outputs based on the established patterns. The weights are applied to the node functions to facilitate refinement of the model to recognize certain patterns (i.e., increased weight is given to node functions resulting in correct outputs), and/or to adapt to new patterns. For example, a neural network model may be configured to receive input data, detect patterns in the image data representing human body parts, perform image segmentation, and generate an output that classifies one or more portions of the image data as representative of segments of a player's body parts (e.g., a box having coordinates relative to the image data that encapsulates a face, an arm, a hand, etc. and classifies the encapsulated area as a "human," "face," "arm," "hand," etc.).

For instance, to train a neural network to identify the most relevant guesses for identifying a human body part, for example, a predetermined dataset of raw image data including image data of human body parts, and with known outputs, is provided to the neural network. As each node function is applied to the raw input of a known output, an error correction analysis is performed such that node functions that result in outputs near or matching the known output may be given an increased weight while node functions having a significant error may be given a decreased weight. In the example of identifying a human face, node functions that consistently recognize image patterns of facial features (e.g., nose, eyes, mouth, etc.) may be given additional weight. Similarly, in the example of identifying a human hand, node functions that consistently recognize image patterns of hand features (e.g., wrist, fingers, palm, etc.) may be given additional weight. The outputs of the node functions (including the respective weights) are then evaluated in combination to provide an output such as a data structure representing a human face. Training may be repeated to further refine the pattern-recognition of the model, and the model may still be refined during deployment (i.e., raw input without a known data output).

At least some of the neural network models applied by the tracking controller 204 may be deep neural network (DNN) models. DNN models include at least three layers of node functions linked together to break the complexity of image analysis into a series of steps of increasing abstraction from the original image data. For example, for a DNN model trained to detect human faces from an image, a first layer may be trained to identify groups of pixels that represent the boundary of facial features, a second layer may be trained to identify the facial features as a whole based on the identified boundaries, and a third layer may be trained to determine whether or not the identified facial features form a face and distinguish the face from other faces. The multi-layered nature of the DNN models may facilitate more targeted weights, a reduced number of node functions, and/or pipeline processing of the image data (e.g., for a three-layered DNN model, each stage of the model may process three frames of image data in parallel).

In at least some embodiments, each model applied by the tracking controller 204 may be configured to identify a particular aspect of the image data and provide different outputs such that the tracking controller 204 may aggregate the outputs of the neural network models together to identify physical objects as described herein. For example, one model may be trained to identify human faces, while another model may be trained to identify the bodies of players. In such an example, the tracking controller 204 may link together a face of a player to a body of the player by analyzing the outputs of the two models. In other embodiments, a single DNN model may be applied to perform the functionality of several models.

As described in further detail below, the tracking controller 204 may generate data objects for each physical object identified within the captured image data by the DNN models. The data objects are data structures that are generated to link together data associated with corresponding physical objects. For example, the outputs of several DNN models associated with a player may be linked together as part of a player data object.

It is to be understood that the underlying data storage of the data objects may vary in accordance with the computing environment of the memory device or devices that store the data object. That is, factors such as programming language and file system may vary the where and/or how the data object is stored (e.g., via a single block allocation of data storage, via distributed storage with pointers linking the data together, etc.). In addition, some data objects may be stored across several different memory devices or databases.

In some embodiments, the player data objects include a player identifier, and data objects of other physical objects include other identifiers. The identifiers uniquely identify the physical objects such that the data stored within the data objects is tied to the physical objects. In some embodiments, the identifiers may be incorporated into other systems or subsystems. For example, a player account system may store player identifiers as part of player accounts, which may be used to provide benefits, rewards, and the like to players. In certain embodiments, the identifiers may be provided to the tracking controller 204 by other systems that may have already generated the identifiers.

In at least some embodiments, the data objects and identifiers may be stored by the tracking database system 208. The tracking database system 208 includes one or more data storage devices (e.g., one or more databases) that store data from at least the tracking controller 204 in a structured, addressable manner. That is, the tracking database system 208 stores data according to one or more linked metadata fields that identify the type of data stored and can be used to group stored data together across several metadata fields. The stored data is addressable such that stored data within the tracking database system 208 may be tracked after initial storage for retrieval, deletion, and/or subsequent data manipulation (e.g., editing or moving the data). The tracking database system 208 may be formatted according to one or more suitable file system structures (e.g., FAT, exFAT, ext4, NTFS, etc.).

The tracking database system 208 may be a distributed system (i.e., the data storage devices are distributed to a plurality of computing devices) or a single device system. In certain embodiments, the tracking database system 208 may be integrated with one or more computing devices configured to provide other functionality to the gaming system 200 and/or other gaming systems. For example, the tracking database system 208 may be integrated with the tracking controller 204 or the server system 214.

In the example embodiment, the tracking database system 208 is configured to facilitate a lookup function on the stored data for the tracking controller 204. The lookup function compares input data provided by the tracking controller 204 to the data stored within the tracking database system 208 to identify any "matching" data. It is to be understood that "matching" within the context of the lookup function may refer to the input data being the same, substantially similar, or linked to stored data in the tracking database system 208. For example, if the input data is an image of a player's face, the lookup function may be performed to compare the input data to a set of stored images of historical players to determine whether or not the player captured in the input data is a returning player. In this example, one or more image comparison techniques may be used to identify any "matching" image stored by the tracking database system 208. For example, key visual markers for distinguishing the player may be extracted from the input data and compared to similar key visual markers of the stored data. If the same or substantially similar visual markers are found within the tracking database system 208, the matching stored image may be retrieved. In addition to or instead of the matching image, other data linked to the matching stored image may be retrieved during the lookup function, such as a player account number, the player's name, etc. In at least some embodiments, the tracking database system 208 includes at least one computing device that is configured to perform the lookup function. In other embodiments, the lookup function is performed by a device in communication with the tracking database system 208 (e.g., the tracking controller 204) or a device in which the tracking database system 208 is integrated within.

Figure 3:
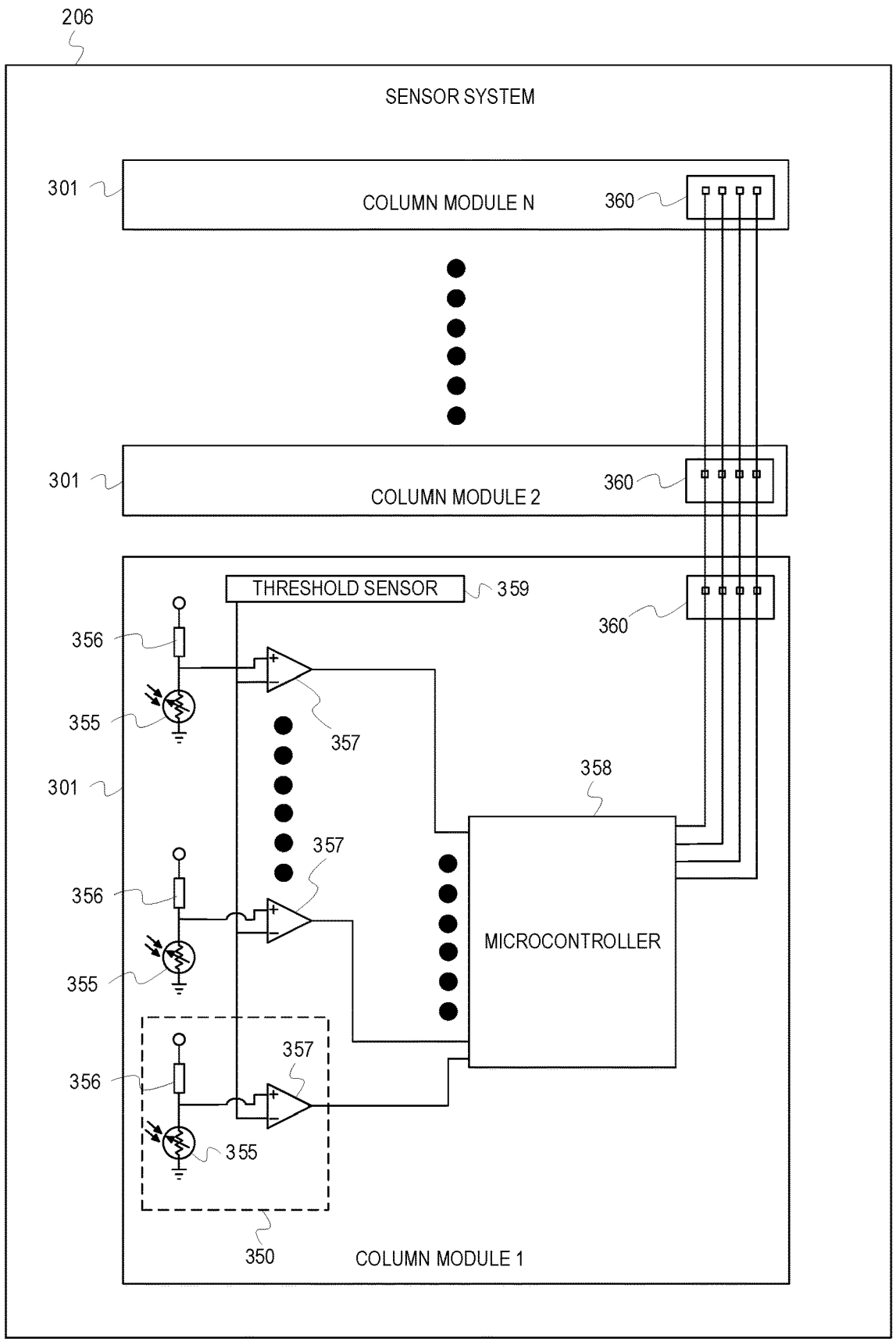
FIG. 3 is a diagram of an exemplary sensor system for a chip tray according to one or more embodiments of the present disclosure.
Figure 5:
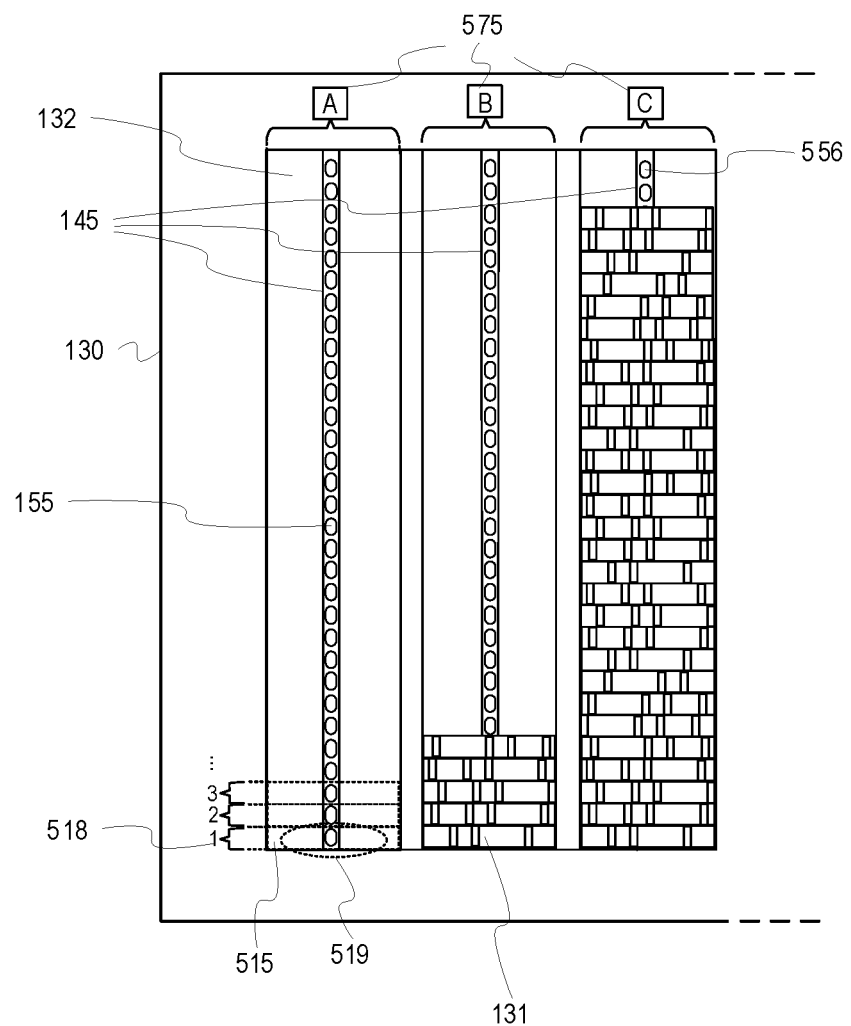
FIG. 5 is a diagram of an exemplary chip tray according to one or more embodiments of the present disclosure.

FIG. 3 is a diagram of an exemplary sensor system (e.g., sensor system 206) for the chip tray 130 according to one or more embodiments of the present disclosure. In the example illustrated in FIG. 3, the sensor system 206 includes at least one of a plurality of column modules 301 for each one of the columns 132 of the chip tray 130. In some embodiments, each one of the column modules 301 is equivalent to each one of the sensor arrays 145 positioned in each of the columns 132. In one embodiment. The sensor system 206 utilizes LDRs 355 as examples of the light sensors 155 described previously. Each of the LDRs 355 are connected to a resistor 356 in a voltage divider circuit, the output of which is connected to a comparator 357. The combination of the LDR 355, the resistor 356, and the comparator 357 may be referred to more succinctly as a sensor unit 350. Each of the comparators 357 connect the voltage divider circuits to a microcontroller 358 as shown in FIG. 3. The microcontroller 358 is connected to a communication bus 360. Each of the column modules 301 are connected to each other via the communication bus 360. Each one of the comparators 357 compares an output from its respective one of the LDRs 355 to a calibrated threshold value (measured by a threshold sensor 359). The threshold sensor 359 may be equivalent to a sensor unit 350 (e.g., it includes an LDR 355, a resistor 356, and a comparator 357). The threshold sensor 359 is calibrated to the level of environmental lighting in the gaming environment. In some instances, the threshold sensor 359 is not positioned in the column 132 and is not covered by one of the chips 131. In another embodiment, the threshold sensor 359 is the sensor that is at the highest portion (the top vertical portion) of a sensor array 145, such as sensor 556 as shown in FIG. 5. For instance, as described in more detail in FIG. 4C, a column 132 has a downward slope (e.g., see column 132 which has slight angle of decline 414). In other words, when the bottom portion 416 of the chip tray 130 is resting against a flat plane on the gaming table 101, the columns 132 slope downward so that the chips 131 slide downward within their respective column 132 due to gravity. Consequently, the highest sensor in the array 145 would be the last to be covered up by a chip 131 as all other chips 131 in the given column would slide downward within the column 132. Thus, if the threshold sensor 359 is at the top of the array as shown in FIG. 5, then it would be the last sensor in the array to be covered up, and thus can function as the threshold array 359 until it is covered up. If the amount of light sensed from the threshold sensor 359 is less than that of any other threshold sensor 349 in another column, then the column 132 may be considered full. In other embodiments, the threshold sensor 359 is not covered (e.g., it is outside of the column 132), and thus functions as a baseline measurement for the level of ambient light at all times. In some embodiments, the sensor system 206 utilizes a single threshold sensor 359 as a baseline, ambient-light reference for the entire chip tray 130.

The components of the sensor system 206 (e.g., the LDRs 355, the comparators 357, the resistors 356, the microcontroller 358, etc.) may be surface mounted devices (SMDs) placed on a printed circuit board (PCB) connected with etched circuit lines (e.g., see printed-circuit board 460 in FIG. 4). The tracking controller 204 receives data from the light-sensor system 206 for each of the column modules 301. Thus, the tracking controller 204 calculates the number of chips 131 in each column 132. In some embodiments, the data is sent via an inter-integrated circuit (I²C) communication protocol. The tracking controller 204 can access each module using the bus 360 by addressing each column module 301 individually.

FIGS. 4A, 4B, and 4C are diagrams that illustrate different perspective views of a column of a chip tray according to one or more embodiments of the present disclosure FIG. 4A illustrates a portion of a single one of the columns 132. Different portions of the same one of the columns 132 are illustrated in FIGS. 4B and 4C from different viewing angles. In FIG. 4A, a display is shown 475 that indicates a value 476 of the chips 131 within the given column 132. As illustrated in FIG. 4B, the given column 132 may be designated for chips 131 having a denomination of "twenty-five" betting units (e.g., a $25 chip). Consequently, the tracking controller 204 detects, via the sensor system 206, the number of chips 131 within the given column 132 (designated for $25 chips). The tracking controller 204, for instance, detects the presence of five chips in the column 132. The tracking controller 204 multiples the five chips by twenty-five dollars each, which computes to one-hundred twenty five dollars ($125). As a result, the display 475 presents (e.g., digitally illustrates) the value 476 of "125." In some embodiments, the chip tray 130 also includes a display (not shown) that illustrates a total amount of chips in the chip tray 130 at any given time.

The arrangement of the sensors arrays 145 can be aligned vertically along a column 132 and incorporated with the physical structure of the chip tray 130, such as at the bottom of the columns 132. For example, openings (e.g., holes 448) are formed through the material of the chip tray 130 at the bottom of each of the columns 132 such that the sensors 155 are positioned under the holes 448. In some embodiments, the sensors in the sensor array 145 are positioned a given distance apart from each other. In some embodiments, the given distance from each other corresponds to the thickness (i.e., the height) of a standard chip (e.g., approximately 3.3 mm). Consequently, in some embodiments, the chip tray 130 is configured so that a single one of light sensors 155 corresponds to a single one of the given chips 131 (i.e., in a 1:1 ratio). Furthermore, because (according to some embodiments) the spacing of any given one of the sensors 155 corresponds to the thickness of a single one of the chips 131, then the spacing 440 between the holes 448 (through which the sensors 144 are exposed) are less than the thickness of a standard chip.

A transparent material is positioned over the holes 448, such as a window or a lens (e.g., windows 438), to cover and protect the sensor 155 from dust or debris. The material of the windows 438 is transparent to permit the ambient light 121 to shine through it to reach the one of the sensors 155 beneath. In some instances, the window 438 is shaped as a lens to focus or amplify the ambient light shining through the window 438 onto one of the respective sensors 155. Furthermore, the transparent barrier of the window 438 protects the sensor 155 from being directly exposed to dirt or debris.

In some embodiments, the light sensors 155 are organized into a vertical array. In one embodiment, the light sensors 155 are uniformly spaced and mounted underneath the chip tray 430 along an underside edge 412 of the column 432.

In some embodiments, the light sensors 155 are embedded into the material of the chip tray 130. In some embodiments, a line of the holes 448 are drilled through the material of an interior curved wall 439 of the chip tray 130 along a bottom of the column 132. In some embodiments, a given light sensor 155 is positioned inside each drilled hole approximately 1 mm or less in distance from the interior curved wall 439 of the chip column 132 (upon which rests the edge 480 of any of the given chips 131).

As referred to briefly in the description related to FIG. 3, in some embodiments, the columns 132 are sloped downward at the slight angle of decline 414 (e.g., at approximately a 5 degree angle of decline). In other words, when the bottom portion 416 of the chip tray 130 is resting against a flat plane on the gaming table 101, the columns 132 slope downward so that the chips 131 slide downward (due to gravity). Thus, the array 145, from the perspective of the chip tray 130, appears to be sloping downward. However, the faces of the light sensors 155 are aligned to be approximately perpendicular to the bottom portion of the interior curved wall 439. In other words, the sensing faces of the light sensors 155 are positioned to be approximately perpendicular to the chip edges 480, even though from the perspective of the chip tray 130, the light sensors 155 themselves are at the slight angle of decline 414.

FIG. 5 is a diagram of an exemplary chip tray (e.g., chip tray 130) according to one or more embodiments of the present disclosure. In FIG. 5, each individual sensor 155 from sensor arrays 145 detects a level of ambient light. The controller 204 (e.g. see FIG. 2) analyzes data received from each of the sensors 155, and tracks data for each column 132 individually (e.g., to determine a level of ambient light reaching each sensor 155 in a column 132), and collectively for all columns 132 of the chip tray 130.

Each column 132 has a unique identifier (e.g. column A, column B, column C, and so forth). In some embodiments, the column names may correspond to standard chip denomination values (e.g., "1," "5," "10," "25," 100," "500," etc.). In some embodiments, the chip tray 130 may include markings to indicate the column names (e.g., printed markings, digital illustrations, etc.). In some instances, the chip tray 130 includes electronic displays 575, or other such devices, that graphically or digitally illustrates a value for any given column. In some instances, the chip tray 130 is customizable. For example, the chip tray 130 may include controls that an operator (e.g., a dealer, a pit boss, etc.) can use to program column names to specify denomination values (e.g., via the electronic displays 575). The displays 575 may be interchangeable in function with displays 475 (see FIG. 4A). In other words, displays 475 may be utilized to designate a column name whereas displays 575 may be utilized to designate a current total chip value for any given column 132.

In some embodiments, given that each sensor array 145 is affixed relative to its given column 132, each sensor 155 can be associated with a location identifier 518 for any given chip within any given column. The location identifier 518 may be stored in a data map (e.g., in database system 208) that identifies a physical location of each sensor 155 within any given sensor array 145 within the chip tray 130 and maps the physical location to a coordinate (or group of coordinates) on a two-dimensional overlay grid (e.g., coordinates grid). Thus every given sensor 155 in an array 145 can be associated with a single one of the chips 131 for any chip stack in the chip tray 130. Given the known height of a standard chip, the data map is constructed by mapping the height 515 upward from the bottom of a column to the top of a column. For example, given the known height 515, the map thus determines which sensors from the sensor array 145 are mapped to given coordinates (e.g., to a specific chip 131). For instance, light sensors 155 may be designated with coordinates indicating the location identifier 518 of "(A, 1)," thus specifying the column identifier (e.g., column "A") and the height identifier (e.g., "1"). In the example shown in FIG. 5, the number of light sensors 155 corresponds to one location identifier 518 in a 1-to-1 ratio (i.e., one light sensor 155 per location identifier 518). However, in other embodiments, more than one light sensor 155 can correspond to a single location identifier 518. For instance, the arrays 145 may be constructed to have multiple light sensors within the space 519 of one height identifier. For example, the light sensors 155 may be smaller than a thickness of a standard chip (i.e., multiple light sensors for the height of one chip). Multiple sensors per chip can provide more data to the tracking controller 204. Furthermore, multiple sensors per chip can provide redundancy should one of the light sensors 155 fail within the array 145 during operation.

Figure 6:
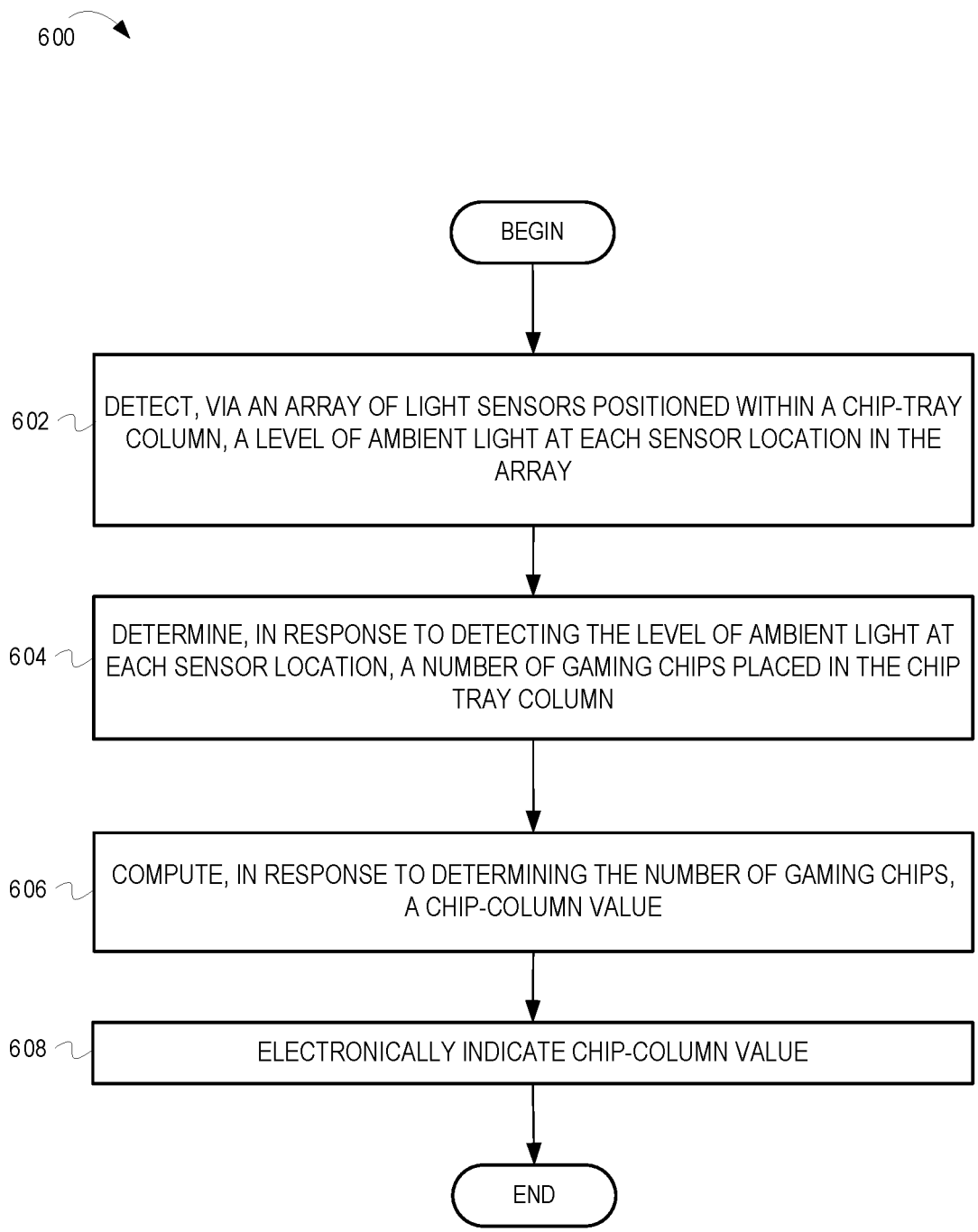
FIG. 6 is a flow diagram of an example method according to one or more embodiments of the present disclosure.

FIG. 6 is a flow diagram of an example method flow (flow 600) according to one or more embodiments of the present disclosure.

In FIG. 6, flow 600 begins at processing block 602 where a processor (e.g., tracking controller 204), detects, via an array of light sensors positioned within a chip tray column, a level of ambient light at each sensor location with the array. In some instances, the tracking controller 204 detects the level of ambient light received at each sensor location by comparing the level of light received at any given sensor to that of a threshold sensor, which detects the level of ambient light at the chip tray 130. In some embodiments, the chip tray 130 includes one threshold sensor per each column 132. In other embodiments, the chip tray 130 includes less than a single threshold sensor for each column 132, for example, a single threshold sensor for an entire chip tray 130, or a limited set of threshold sensors placed at different locations on the chip tray 130. For example, the chip tray 130 may include threshold sensors at each corner of the chip tray 130 and the tracking controller 204 may utilize an average level of ambient light received at each of the threshold sensors as a baseline, or threshold value of the amount of ambient light in the gaming environment at or around the gaming table 101 that shines onto the chip tray 130 without being blocked by a chip. Thus, the tracking controller 204 can compare any detected level of light at any given position of one of the sensors 155 to the threshold value (detected via the threshold sensor(s)) to determine whether the given sensor 155 (at the given position) is being blocked by a chip (thus indicating the presence of a chip at the given location of the given sensor 155).

Referring back to FIG. 6, the flow 600 continues at processing block 604, where the tracking controller 204 determines, in response to detecting the level of ambient light at each sensor location, a number of gaming chips placed in the chip column. For example, as shown in FIG. 4C, each of the chips 131 covers a respective one of the sensors 155 in the array 145. Thus, the tracking controller 204 detects that the level of ambient light at each of those blocked sensors is less than that of the value detected by a threshold sensor. For example, if the tracking controller 204 detects a five percent (5%) or more difference in light levels at any given sensor 155 from that of the threshold value, then the tracking controller 204 determines that at least one of the gaming chips 131 is present at the sensor location (i.e., the tracking controller 204 determines that a chip is blocking the ambient light at the sensor location).

Referring back to FIG. 6, the flow 600 continues at processing block 606 where the tracking controller 204 computes, in response to determining the number of gaming chips, a chip-column value. In some embodiments, the tracking controller 204 determines the chip-column value based on at least the number of chips in any given column. For example, as shown in FIG. FIG. 5, one of the columns 132 (e.g., the column designated as column "B" in FIG. 5), has five chips 131. Column "B" is designated for chips having the denomination value of "twenty-five" (e.g., $25 chips). Thus, the dealer only stacks $25 chips into that column. As a consequence, the tracking controller 204 multiples the value of "5" (representing the five detected chips 131) by the value of "25" (representing the designated denomination value for the given column), resulting in an amount of "125."

In some instances, the tracking controller 204 detects a color pattern for chips placed in a given column 132. For instance, a dealer may track the input and output of chips 131 from the chip tray 130 by placing chips of only a certain denomination value into a designated subset of the columns 132. For example, multiple ones of the columns 132 may be designated to hold lower chip values (e.g., multiple ones of the columns 132 may be designated to hold chips having a value of "1," "5," and "10" (e.g., $1, $5, $10); whereas each higher denomination (e.g., "25," "50," "100," "500," etc.), may be designated to only one of the columns 132 respectively. The tracking controller 204, thus, can optionally detect, via analysis of images of the chip tray 130, whether any of the columns 132 has a chip with an edge-color pattern that does not match that of others in the designated column. For example, the tracking controller 204 can determine that a certain percentage of the chips 131 in any given column have the same given edge-color pattern. In some embodiment, the tracking controller 204 can determine (e.g., deduce) that the edge-color pattern that appears with the most frequency amongst the total number of chips in a given column is the default edge-color pattern for the designated denomination value for that given column. For example, in a column with at least three chips, if two or more possess the same edge-color pattern, the tracking controller 204 can deduce that the chip-denomination value designated for the particular column equates to the chip-denomination value associated with that most-frequently-occurring edge-color pattern. In another embodiments, the tracking controller 204 deduces the chip-denomination value associated with the column by determining the value associated with the edge-color pattern for a majority (or at least a relative majority) of the chips (i.e., the number or part of the total chips having the particular edge-color being greater than any other number or part). The tracking controller 204 can then notify an operator (e.g., the dealer), that the mismatched chip is misplaced within an incorrect one of the columns 132, and instead should be placed into a correct one of the columns 132 designated for the specific denomination value. In some embodiments, the tracking controller 204 utilizes the camera 102 (see FIG. 1), to capture images of the chip tray 130. The tracking controller 204 can analyze the images, using a machine learning model (e.g. a neural network model), trained to detect the chip colors and/or edge patterns that distinguish the different chip denomination values. In some instances, the tracking controller 204 determines, via the machine model analysis, whether a chip is an incorrect column (e.g., detects whether a $25 chip is in a column designated for $5 chips). In some instances, the tracking controller 204 can detect, via electronic image analysis, which columns are designated to each chip denomination value. For example, in some instances, some dealers may switch up chip columns for different chip denomination values throughout a gaming session depending on given gaming conditions. For example, a dealer may have a high-roller or VIP table which requires large betting amounts. The participants may be betting large amounts of chips, and so the dealer may be dealing, during that gaming session, with large denomination values. As a consequence, the dealer may configure the use of the chip tray 130 on the fly, to switch up which columns should be utilize for each given denomination value. However, the dealer may not have the time, during the session, to manually specify column denomination values using manual controls (e.g., using the input device(s) 207 mentioned in FIG. 2). Consequently, in some embodiments, the tracking controller 204 utilizes the machine learning model to automatically detect, in real-time, which columns the dealer is utilizing for given chip denomination values. The tracking controller 204, thus, can detect column denomination values for a given stack of chips within any given column by detecting a common edge color or pattern amongst the chips already in a column. The tracking controller 204 can further give warnings if a chip pattern is detected (via the image analysis), which is different from other chips in the given column. For example, if the difference in chips is high enough (e.g., above a $4 difference), then the tracking controller 204 can generate a warning of a potentially misplaced chip or missing chips (generate warning for dealer, pitboss, etc.).

In some instances, the tracking controller 204 provides real-time warnings (during a gaming session at the gaming table) to indicate potential errors in placement of chips within the stack by the dealer. In some embodiments, the tracking controller 204 evaluates the placement of the chips and provides a report after a dealer session regarding potential errors.

Referring back to FIG. 6, the flow 600 continues at processing block 608 with electronically indicating the chip stack value. For example, after the tracking controller 204 computes a total monetary value for a chip stack in any given column, the tracking controller 204 can indicate the total monetary value via a display (e.g., see display 475 in FIG. 4). In other embodiments, the tracking controller 204 can indicate the total monetary value via a display associated with an operator or administrator that is not at the gaming table 101 (e.g., via a display associated with a computer or device of a pit boss, an accountant, a security officer, etc.). In other embodiments, the tracking controller 204 can electronically indicate a chip-column value via an audio device, such as via a speaker. In some embodiments, the tracking controller 204 can display a chip-column value in the form of a meter or gauge that displays a level of increase or decrease in value for the chip column.

Figure 7:
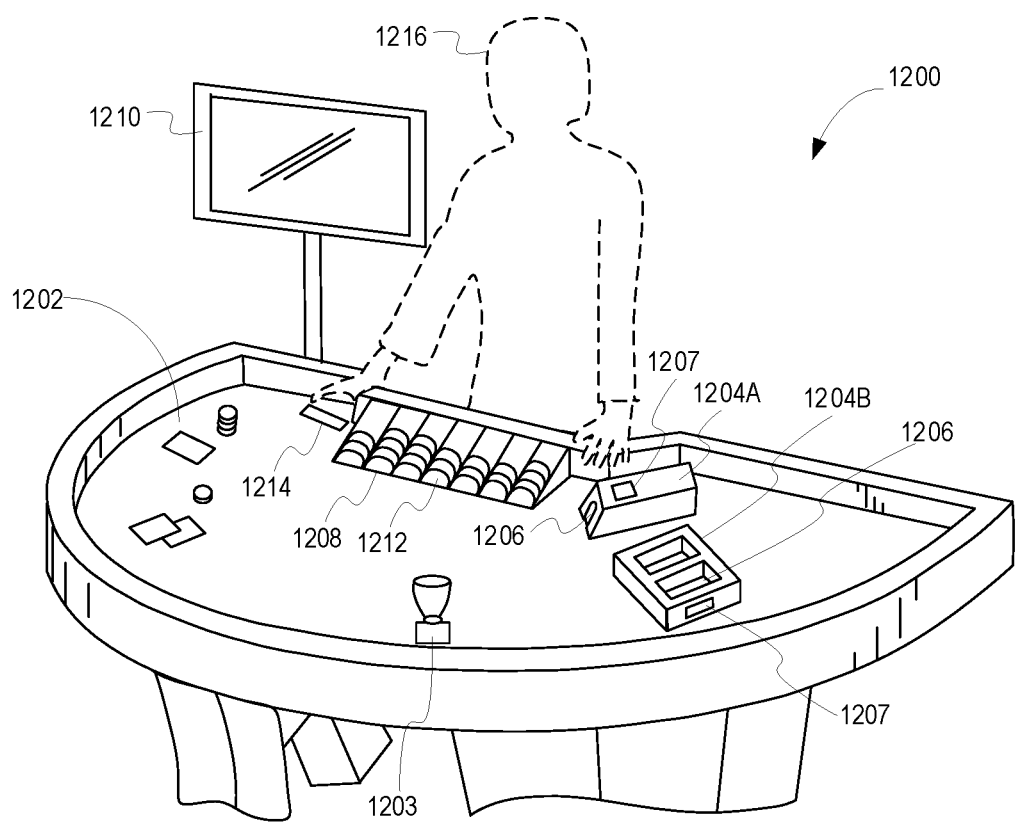
FIG. 7 is a perspective view of a gaming table configured for implementation of embodiments of wagering games in accordance with this disclosure.

FIG. 7 is a perspective view of an embodiment of a gaming table 1200 (which may be configured as the gaming table 101) for implementing wagering games in accordance with this disclosure. The gaming table 1200 may be a physical article of furniture around which participants in the wagering game may stand or sit and on which the physical objects used for administering and otherwise participating in the wagering game may be supported, positioned, moved, transferred, and otherwise manipulated. For example, the gaming table 1200 may include a gaming surface 1202 (e.g., a table surface) on which the physical objects used in administering the wagering game may be located. The gaming surface 1202 may be, for example, a felt fabric covering a hard surface of the table, and a design, conventionally referred to as a "layout," specific to the game being administered may be physically printed on the gaming surface 1202. As another example, the gaming surface 1202 may be a surface of a transparent or translucent material (e.g., glass or plexiglass) onto which a projector, which may be located, for example, above or below the gaming surface 1202, may illuminate a layout specific to the wagering game being administered. In such an example, the specific layout projected onto the gaming surface 1202 may be changeable, enabling the gaming table 1200 to be used to administer different variations of wagering games within the scope of this disclosure or other wagering games. In either example, the gaming surface 1202 may include, for example, designated areas for player positions; areas in which one or more of player cards, dealer cards, or community cards may be dealt; areas in which wagers may be accepted; areas in which wagers may be grouped into pots; and areas in which rules, pay tables, and other instructions related to the wagering game may be displayed. As a specific, non-limiting example, the gaming surface 1202 may be configured as any table surface described herein.

In some embodiments, the gaming table 1200 may include a display 1210 separate from the gaming surface 1202. The display 1210 may be configured to face players, prospective players, and spectators and may display, for example, information randomly selected by a shuffler device and also displayed on a display of the shuffler device; rules; pay tables; real-time game status, such as wagers accepted and cards dealt; historical game information, such as amounts won, amounts wagered, percentage of hands won, and notable hands achieved; the commercial game name, the casino name, advertising and other instructions and information related to the wagering game. The display 1210 may be a physically fixed display, such as an edge lit sign, in some embodiments. In other embodiments, the display 1210 may change automatically in response to a stimulus (e.g., may be an electronic video monitor).

The gaming table 1200 may include particular machines and apparatuses configured to facilitate the administration of the wagering game. For example, the gaming table 1200 may include one or more card-handling devices 1204A, 1204B. The card-handling device 1204A may be, for example, a shoe from which physical cards 1206 from one or more decks of intermixed playing cards may be withdrawn, one at a time. Such a card-handling device 1204A may include, for example, a housing in which cards 1206 are located, an opening from which cards 1206 are removed, and a card-presenting mechanism (e.g., a moving weight on a ramp configured to push a stack of cards down the ramp) configured to continually present new cards 1206 for withdrawal from the shoe.

In some embodiments in which the card-handling device 1204A is used, the card-handling device 1204A may include a random number generator 151 and the display 152, in addition to or rather than such features being included in a shuffler device. In addition to the card-handling device 1204A, the card-handling device 1204B may be included. The card-handling device 1204B may be, for example, a shuffler configured to select information (using a random number generator), to display the selected information on a display of the shuffler, to reorder (either randomly or pseudo-randomly) physical playing cards 1206 from one or more decks of playing cards, and to present randomized cards 1206 for use in the wagering game. Such a card-handling device 1204B may include, for example, a housing, a shuffling mechanism configured to shuffle cards, and card inputs and outputs (e.g., trays). Shufflers may include card recognition capability that can form a randomly ordered set of cards within the shuffler. The card-handling device 1204 may also be, for example, a combination shuffler and shoe in which the output for the shuffler is a shoe.

In some embodiments, the card-handling device 1204 may be configured and programmed to administer at least a portion of a wagering game being played utilizing the card-handling device 1204. For example, the card-handling device 1204 may be programmed and configured to randomize a set of cards and deliver cards individually for use according to game rules and player and or dealer game play elections. More specifically, the card-handling device 1204 may be programmed and configured to, for example, randomize a set of six complete decks of cards including one or more standard 52-card decks of playing cards and, optionally, any specialty cards (e.g., a cut card, bonus cards, wild cards, or other specialty cards). In some embodiments, the card-handling device 1204 may present individual cards, one at a time, for withdrawal from the card-handling device 1204. In other embodiments, the card-handling device 1204 may present an entire shuffled block of cards that are transferred manually or automatically into a card dispensing shoe 1204. In some such embodiments, the card-handling device 1204 may accept dealer input, such as, for example, a number of replacement cards for discarded cards, a number of hit cards to add, or a number of partial hands to be completed. In other embodiments, the device may accept a dealer input from a menu of game options indicating a game selection, which will select programming to cause the card-handling device 1204 to deliver the requisite number of cards to the game according to game rules, player decisions and dealer decisions. In still other embodiments, the card-handling device 1204 may present the complete set of randomized cards for manual or automatic withdrawal from a shuffler and then insertion into a shoe. As specific, non-limiting examples, the card-handling device 1204 may present a complete set of cards to be manually or automatically transferred into a card dispensing shoe, or may provide a continuous supply of individual cards.

In another embodiment, the card handling device may be a batch shuffler, such as by randomizing a set of cards using a gripping, lifting, and insertion sequence.

In some embodiments, the card-handling device 1204 may employ a random number generator device to determine card order, such as, for example, a final card order or an order of insertion of cards into a compartment configured to form a packet of cards. The compartments may be sequentially numbered, and a random number assigned to each compartment number prior to delivery of the first card. In other embodiments, the random number generator may select a location in the stack of cards to separate the stack into two sub-stacks, creating an insertion point within the stack at a random location. The next card may be inserted into the insertion point. In yet other embodiments, the random number generator may randomly select a location in a stack to randomly remove cards by activating an ejector.

Regardless of whether the random number generator (or generators) is hardware or software, it may be used to implement specific game administrations methods of the present disclosure.

The card-handling device 1204 may simply be supported on the gaming surface 1202 in some embodiments. In other embodiments, the card-handling device 1204 may be mounted into the gaming table 1202 such that the card-handling device 1204 is not manually removable from the gaming table 1202 without the use of tools. In some embodiments, the deck or decks of playing cards used may be standard, 52-card decks. In other embodiments, the deck or decks used may include cards, such as, for example, jokers, wild cards, bonus cards, etc. The shuffler may also be configured to handle and dispense security cards, such as cut cards.

In some embodiments, the card-handling device 1204 may include an electronic display 1207 for displaying information related to the wagering game being administered. The electronic display 1207 may display a menu of game options, the name of the game selected, the number of cards per hand to be dispensed, acceptable amounts for other wagers (e.g., maximums and minimums), numbers of cards to be dealt to recipients, locations of particular recipients for particular cards, winning and losing wagers, pay tables, winning hands, losing hands, and payout amounts. In other embodiments, information related to the wagering game may be displayed on another electronic display, such as, for example, the display 1210 described previously.

The type of card-handling device 1204 employed to administer embodiments of the disclosed wagering game, as well as the type of card deck employed and the number of decks, may be specific to the game to be implemented. Cards used in games of this disclosure may be, for example, standard playing cards from one or more decks, each deck having cards of four suits (clubs, hearts, diamonds, and spades) and of rankings ace, king, queen, jack, and ten through two in descending order. As a more specific example, six, seven, or eight standard decks of such cards may be intermixed. Typically, six or eight decks of 52 standard playing cards each may be intermixed and formed into a set to administer a blackjack or blackjack variant game. After shuffling, the randomized set may be transferred into another portion of the card-handling device 1204B or another card-handling device 1204A altogether, such as a mechanized shoe capable of reading card rank and suit.

The gaming table 1200 may include one or more chip racks 1208 configured to facilitate accepting wagers, transferring lost wagers to the house, and exchanging monetary value for wagering elements 1212 (e.g., chips). For example, the chip rack 1208 (also referred to as a chip tray herein) may include a series of token support columns, each of which may support tokens of a different type (e.g., color and denomination). In some embodiments, the chip rack 1208 may be configured to automatically present a selected number of chips using a chip-cutting-and-delivery mechanism. In some embodiments, the gaming table 1200 may include a drop box 1214 for money that is accepted in exchange for wagering elements or chips 1212. The drop box 1214 may be, for example, a secure container (e.g., a safe or lockbox) having a one-way opening into which money may be inserted and a secure, lockable opening from which money may be retrieved. Such drop boxes 1214 are known in the art, and may be incorporated directly into the gaming table 1200 and may, in some embodiments, have a removable container for the retrieval of money in a separate, secure location.

When administering a wagering game in accordance with embodiments of this disclosure, a dealer 1216 may receive money (e.g., cash) from a player in exchange for wagering elements 1212. The dealer 1216 may deposit the money in the drop box 1214 and transfer physical wagering elements 1212 to the player. As part of the method of administering the game, the dealer 1216 may accept one or more initial wagers from the player, which may be reflected by the dealer 1216 permitting the player to place one or more wagering elements 1212 or other wagering tokens (e.g., cash) within designated areas on the gaming surface 1202 associated with the various wagers of the wagering game. Once initial wagers have been accepted, the dealer 1216 may remove physical cards 1206 from the card-handling device 1204 (e.g., individual cards, packets of cards, or the complete set of cards) in some embodiments. In other embodiments, the physical cards 1206 may be hand-pitched (i.e., the dealer 1216 may optionally shuffle the cards 1206 to randomize the set and may hand-deal cards 1206 from the randomized set of cards). The dealer 1216 may position cards 1206 within designated areas on the gaming surface 1202, which may designate the cards 1206 for use as individual player cards, community cards, or dealer cards in accordance with game rules. House rules may require the dealer to accept both main and secondary wagers before card distribution. House rules may alternatively allow the player to place only one wager (i.e., the second wager) during card distribution and after the initial wagers have been placed, or after card distribution but before all cards available for play are revealed.

In some embodiments, after dealing the cards 1206, and during play, according to the game rules, any additional wagers (e.g., the play wager) may be accepted, which may be reflected by the dealer 1216 permitting the player to place one or more wagering elements 1212 within the designated area (i.e., area 124) on the gaming surface 1202 associated with the play wager of the wagering game. The dealer 1216 may perform any additional card dealing according to the game rules. Finally, the dealer 1216 may resolve the wagers, award winning wagers to the players, which may be accomplished by giving wagering elements 1212 from the chip rack 1208 to the players, and transferring losing wagers to the house, which may be accomplished by moving wagering elements 1212 from the player designated wagering areas to the chip rack 1208.

Figure 8:
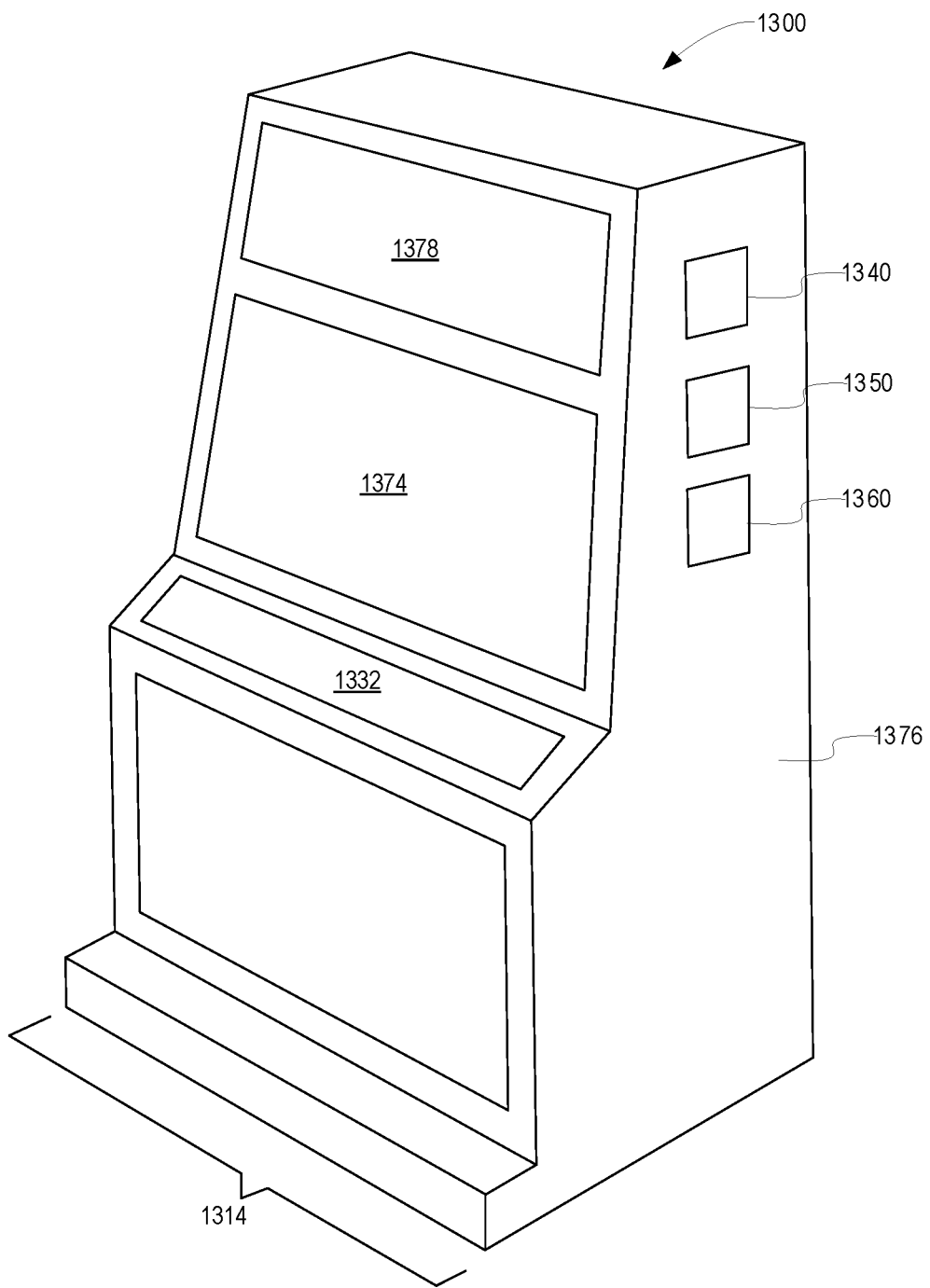
FIG. 8 is a perspective view of an individual electronic gaming device configured for implementation of embodiments of wagering games in accordance with this disclosure.

FIG. 8 is a perspective view of an individual electronic gaming device 1300 (e.g., an electronic gaming machine (EGM)) configured for implementing wagering games according to this disclosure. The individual electronic gaming device 1300 may include an individual player position 1314 including a player input area 1332 configured to enable a player to interact with the individual electronic gaming device 1300 through various input devices (e.g., buttons, levers, touchscreens). The player input area 1332 may further includes a cash- or ticket-in receptor, by which cash or a monetary-valued ticket may be fed, by the player, to the individual electronic gaming device 1300, which may then detect, in association with game-logic circuitry in the individual electronic gaming device 1300, the physical item (cash or ticket) associated with the monetary value and then establish a credit balance for the player. In other embodiments, the individual electronic gaming device 1300 detects a signal indicating an electronic wager was made. Wagers may then be received, and covered by the credit balance, upon the player using the player input area 1332 or elsewhere on the machine (such as through a touch screen). Won payouts and pushed or returned wagers may be reflected in the credit balance at the end of the round, the credit balance being increased to reflect won payouts and pushed or returned wagers and/or decreased to reflect lost wagers.

The individual electronic gaming device 1300 may further include, in the individual player position 1312, a ticket-out printer or monetary dispenser through which a payout from the credit balance may be distributed to the player upon receipt of a cashout instruction, input by the player using the player input area 1332.

The individual electronic gaming device 1300 may include a gaming screen 1374 configured to display indicia for interacting with the individual electronic gaming device 1300, such as through processing one or more programs stored in game-logic circuitry providing memory 1340 to implement the rules of game play at the individual electronic gaming device 1300. Accordingly, in some embodiments, game play may be accommodated without involving physical playing cards, chips or other wagering elements, and live personnel. The action may instead be simulated by a control processor 1350 operably coupled to the memory 1340 and interacting with and controlling the individual electronic gaming device 1300. For example, the processor may cause the display 1374 to display cards, including virtual player and virtual dealer cards for playing games of the present disclosure.

Although the individual electronic gaming device 1300 displayed in FIG. 8 has an outline of a traditional gaming cabinet, the individual electronic gaming device 1300 may be implemented in other ways, such as, for example, on a bartop gaming terminal, through client software downloaded to a portable device, such as a smart phone, tablet, or laptop computer. The individual electronic gaming device 1300 may also be a non-portable personal computer (e.g., a desktop or all-in-one computer) or other computing device. In some embodiments, client software is not downloaded but is native to the device or is otherwise delivered with the device when distributed. In such embodiments, the credit balance may be established by receiving payment via credit card or player's account information input into the system by the player. Cashouts of the credit balance may be allotted to a player's account or card.

A communication device 1360 may be included and operably coupled to the processor 1350 such that information related to operation of the individual electronic gaming device 1300, information related to the game play, or combinations thereof may be communicated between the individual electronic gaming device 1300 and other devices, such as a server, through a suitable communication medium, such, as, for example, wired networks, Wi-Fi networks, and cellular communication networks.

The gaming screen 1374 may be carried by a generally vertically extending cabinet 1376 of the individual electronic gaming device 1300. The individual electronic gaming device 1300 may further include banners to communicate rules of game play, instructions, game play advice or hints and the like, such as along a top portion 1378 of the cabinet 1376 of the individual electronic gaming device 1300. The individual electronic gaming device 1300 may further include additional decorative lights (not shown), and speakers (not shown) for transmitting and optionally receiving sounds during game play.

Some embodiments may be implemented at locations including a plurality of player stations. Such player stations may include an electronic display screen for display of game information (e.g., cards, wagers, and game instructions) and for accepting wagers and facilitating credit balance adjustments. Such player stations may, optionally, be integrated in a table format, may be distributed throughout a casino or other gaming site, or may include both grouped and distributed player stations.

Figure 9:
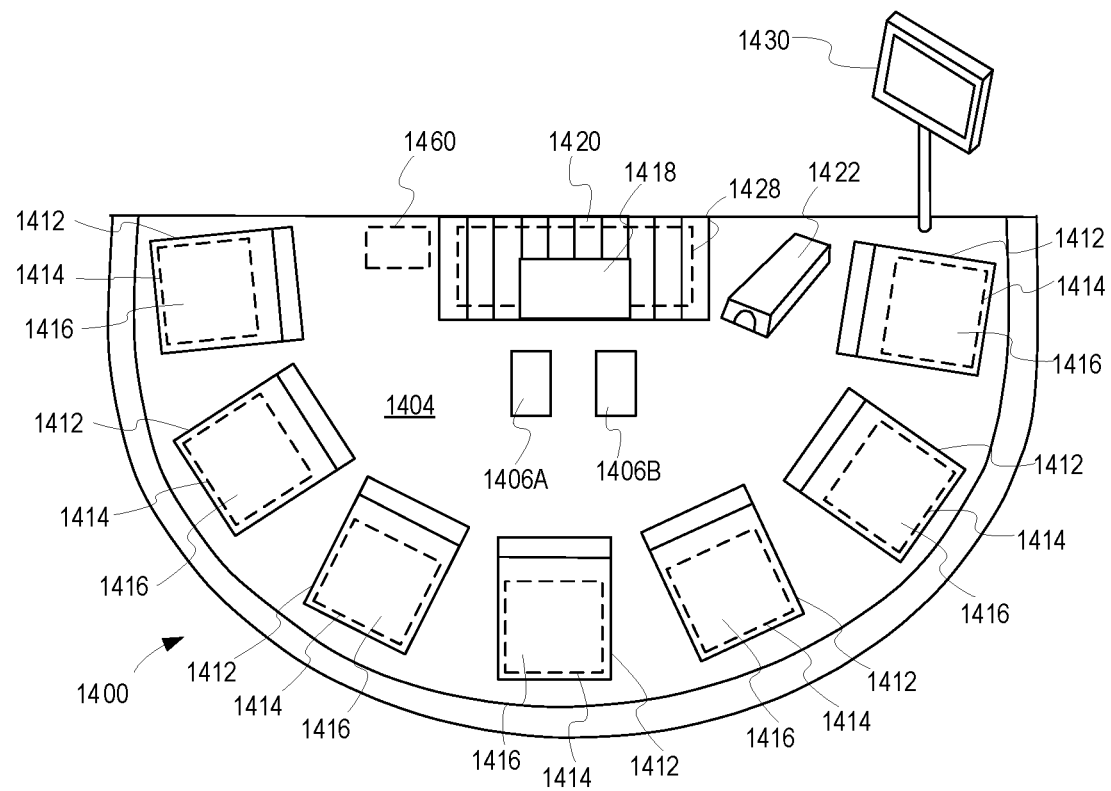
FIG. 9 is a top view of a table configured for implementation of embodiments of wagering games in accordance with this disclosure.

FIG. 9 is a top view of a suitable table 1010 configured for implementing wagering games according to this disclosure. The table 1010 may include a playing surface 1404. The table 1010 may include electronic player stations 1412. Each player station 1412 may include a player interface 1416, which may be used for displaying game information (e.g., graphics illustrating a player layout, game instructions, input options, wager information, game outcomes, etc.) and accepting player elections. The player interface 1416 may be a display screen in the form of a touch screen, which may be at least substantially flush with the playing surface 1404 in some embodiments. Each player interface 1416 may be operated by its own local game processor 1414 (shown in dashed lines), although, in some embodiments, a central game processor 1428 (shown in dashed lines) may be employed and may communicate directly with player interfaces 1416. In some embodiments, a combination of individual local game processors 1414 and the central game processor 1428 may be employed. Each of the processors 1414 and 1428 may be operably coupled to memory including one or more programs related to the rules of game play at the table 1010.

A communication device 1460 may be included and may be operably coupled to one or more of the local game processors 1414, the central game processor 1428, or combinations thereof, such that information related to operation of the table 1010, information related to the game play, or combinations thereof may be communicated between the table 1010 and other devices through a suitable communication medium, such as, for example, wired networks, Wi-Fi networks, and cellular communication networks.

The table 1010 may further include additional features, such as a dealer chip tray 1420, which may be used by the dealer to cash players in and out of the wagering game, whereas wagers and balance adjustments during game play may be performed using, for example, virtual chips (e.g., images or text representing wagers). For embodiments using physical cards 1406a and 1406b, the table 1010 may further include a card-handling device 1422 such as a card shoe configured to read and deliver cards that have already been randomized. For embodiments using virtual cards, the virtual cards may be displayed at the individual player interfaces 1416. Physical playing cards designated as "common cards" may be displayed in a common card area.

The table 1010 may further include a dealer interface 1418, which, like the player interfaces 1416, may include touch screen controls for receiving dealer inputs and assisting the dealer in administering the wagering game. The table 1010 may further include an upright display 1430 configured to display images that depict game information, pay tables, hand counts, historical win/loss information by player, and a wide variety of other information considered useful to the players. The upright display 1430 may be double sided to provide such information to players as well as to casino personnel.

Although an embodiment is described showing individual discrete player stations, in some embodiments, the entire playing surface 1404 may be an electronic display that is logically partitioned to permit game play from a plurality of players for receiving inputs from, and displaying game information to, the players, the dealer, or both.

Figure 10:
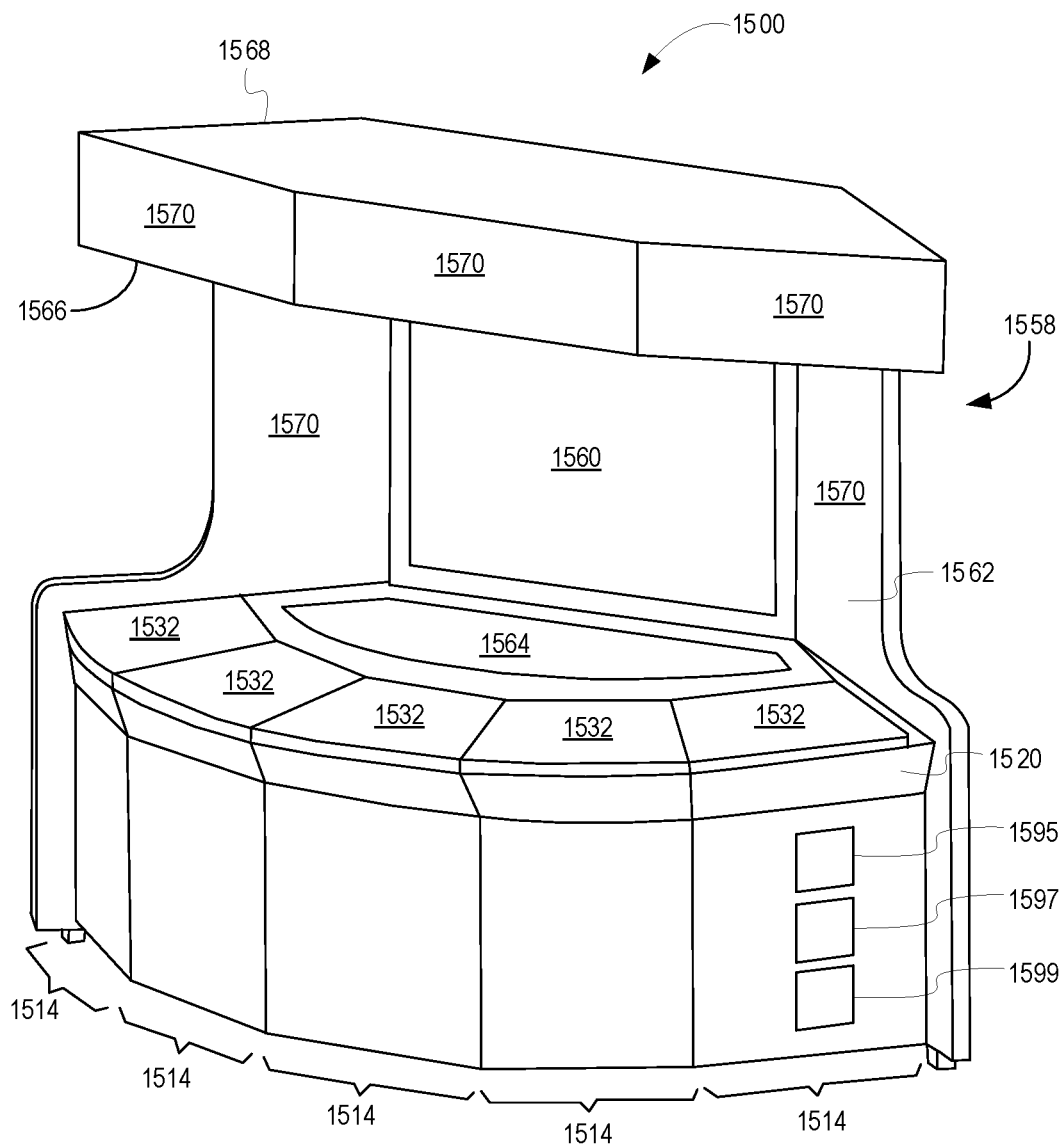
FIG. 10 is a perspective view of another embodiment of a table configured for implementation of embodiments of wagering games in accordance with this disclosure, wherein the implementation includes a virtual dealer.

FIG. 10 is a perspective view of another embodiment of a suitable electronic multi-player table 1500 configured for implementing wagering games according to the present disclosure utilizing a virtual dealer. The table 1500 may include player positions 1514 arranged in a bank about an arcuate edge 1520 of a video device 1558 that may comprise a card screen 1564 and a virtual dealer screen 1560. The dealer screen 1560 may display a video simulation of the dealer (i.e., a virtual dealer) for interacting with the video device 1558, such as through processing one or more stored programs stored in memory 1595 to implement the rules of game play at the video device 1558. The dealer screen 1560 may be carried by a generally vertically extending cabinet 1562 of the video device 1558. The substantially horizontal card screen 1564 may be configured to display at least one or more of the dealer's cards, any community cards, and each player's cards dealt by the virtual dealer on the dealer screen 1560.

Each of the player positions 1514 may include a player interface area 1532 configured for wagering and game play interactions with the video device 1558 and virtual dealer. Accordingly, game play may be accommodated without involving physical playing cards, poker chips, and live personnel. The action may instead be simulated by a control processor 1597 interacting with and controlling the video device 1558. The control processor 1597 may be programmed, by known techniques, to implement the rules of game play at the video device 1558. As such, the control processor 1597 may interact and communicate with display/input interfaces and data entry inputs for each player interface area 1532 of the video device 1558. Other embodiments of tables and gaming devices may include a control processor that may be similarly adapted to the specific configuration of its associated device.

A communication device 1599 may be included and operably coupled to the control processor 1597 such that information related to operation of the table 1500, information related to the game play, or combinations thereof may be communicated between the table 1500 and other devices, such as a central server, through a suitable communication medium, such, as, for example, wired networks, Wi-Fi networks, and cellular communication networks.

The video device 1558 may further include banners communicating rules of play and the like, which may be located along one or more walls 1570 of the cabinet 1562. The video device 1558 may further include additional decorative lights and speakers, which may be located on an underside surface 1566, for example, of a generally horizontally extending top 1568 of the cabinet 1562 of the video device 1558 generally extending toward the player positions 1514.

Although an embodiment is described showing individual discrete player stations, in some embodiments, the entire playing surface (e.g., player interface areas 1532, card screen 1564, etc.) may be a unitary electronic display that is logically partitioned to permit game play from a plurality of players for receiving inputs from, and displaying game information to, the players, the dealer, or both.

Figure 11:
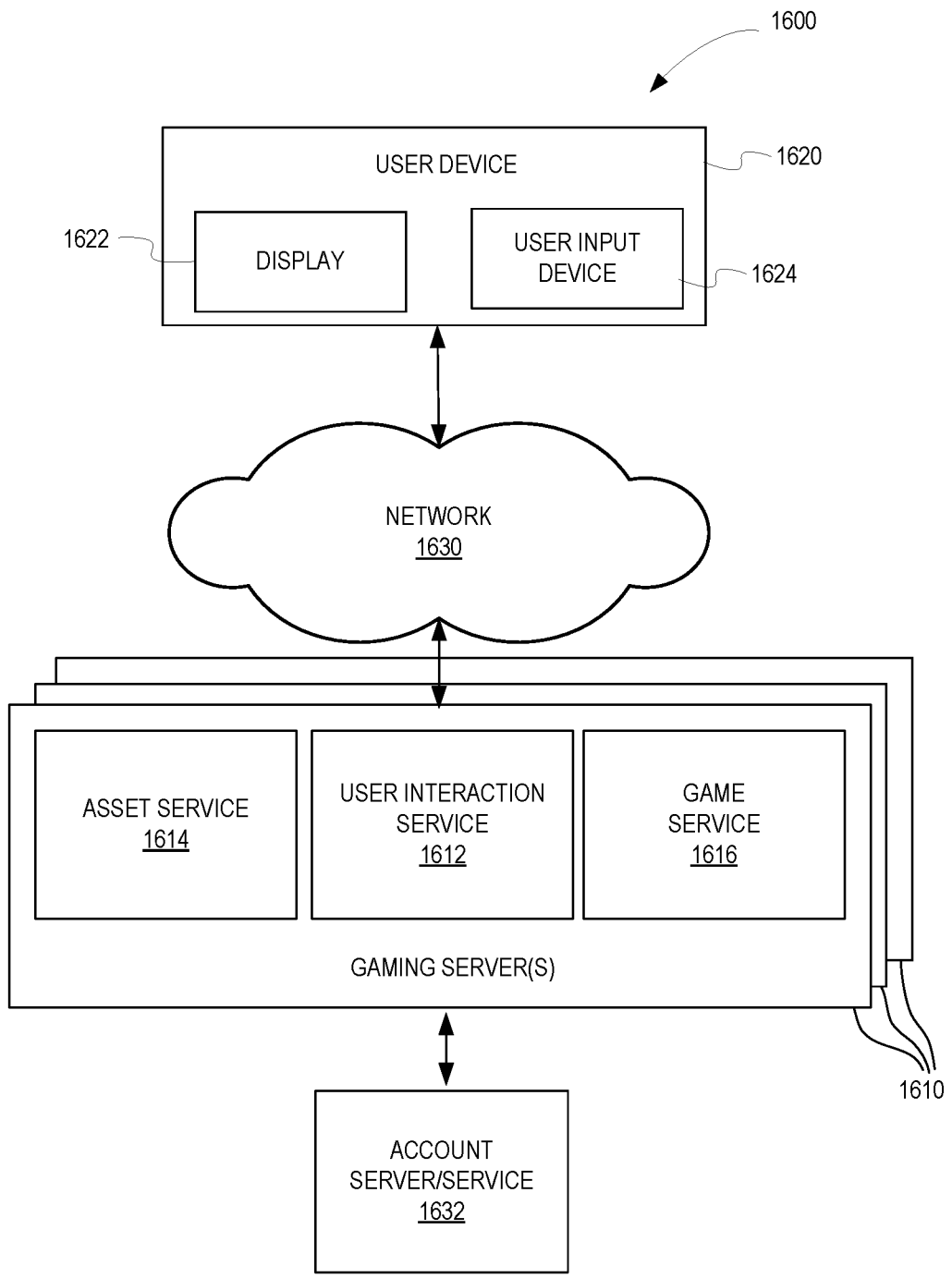
FIG. 11 is a schematic block diagram of a gaming system for implementing embodiments of wagering games in accordance with this disclosure.

In some embodiments, wagering games in accordance with this disclosure may be administered using a gaming system employing a client-server architecture (e.g., over the Internet, a local area network, etc.). FIG. 11 is a schematic block diagram of an illustrative gaming system 1600 for implementing wagering games according to this disclosure. The gaming system 1600 may enable end users to remotely access game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not limited to, Class II and Class III games as defined under 25 U.S.C. § 2701 et seq. ("Indian Gaming Regulatory Act"). Such games may include banked and/or non-banked games.

The wagering games supported by the gaming system 1600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 1600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 1600 may include a gaming platform to establish a portal for an end user to access a wagering game hosted by one or more gaming servers 1610 over a network 1630. In some embodiments, games are accessed through a user interaction service 1612. The gaming system 1600 enables players to interact with a user device 1620 through a user input device 1624 and a display 1622 and to communicate with one or more gaming servers 1610 using a network 1630 (e.g., the Internet). Typically, the user device is remote from the gaming server 1610 and the network is the word-wide web (i.e., the Internet).

In some embodiments, the gaming servers 1610 may be configured as a single server to administer wagering games in combination with the user device 1620. In other embodiments, the gaming servers 1610 may be configured as separate servers for performing separate, dedicated functions associated with administering wagering games. Accordingly, the following description also discusses "services" with the understanding that the various services may be performed by different servers or combinations of servers in different embodiments. As shown in FIG. 11, the gaming servers 1610 may include a user interaction service 1612, a game service 1616, and an asset service 1614. In some embodiments, one or more of the gaming servers 1610 may communicate with an account server 1632 performing an account service 1632. As explained more fully below, for some wagering type games, the account service 1632 may be separate and operated by a different entity than the gaming servers 1610; however, in some embodiments the account service 1632 may also be operated by one or more of the gaming servers 1610.

The user device 1620 may communicate with the user interaction service 1612 through the network 1630. The user interaction service 1612 may communicate with the game service 1616 and provide game information to the user device 1620. In some embodiments, the game service 1616 may also include a game engine. The game engine may, for example, access, interpret, and apply game rules. In some embodiments, a single user device 1620 communicates with a game provided by the game service 1616, while other embodiments may include a plurality of user devices 1620 configured to communicate and provide end users with access to the same game provided by the game service 1616. In addition, a plurality of end users may be permitted to access a single user interaction service 1612, or a plurality of user interaction services 1612, to access the game service 1616. The user interaction service 1612 may enable a user to create and access a user account and interact with game service 1616. The user interaction service 1612 may enable users to initiate new games, join existing games, and interface with games being played by the user.

The user interaction service 1612 may also provide a client for execution on the user device 1620 for accessing the gaming servers 1610. The client provided by the gaming servers 1610 for execution on the user device 1620 may be any of a variety of implementations depending on the user device 1620 and method of communication with the gaming servers 1610. In one embodiment, the user device 1620 may connect to the gaming servers 1610 using a web browser, and the client may execute within a browser window or frame of the web browser. In another embodiment, the client may be a stand-alone executable on the user device 1620.

For example, the client may comprise a relatively small amount of script (e.g., JAVASCRIPT®), also referred to as a "script driver," including scripting language that controls an interface of the client. The script driver may include simple function calls requesting information from the gaming servers 1610. In other words, the script driver stored in the client may merely include calls to functions that are externally defined by, and executed by, the gaming servers 1610. As a result, the client may be characterized as a "thin client." The client may simply send requests to the gaming servers 1610 rather than performing logic itself. The client may receive player inputs, and the player inputs may be passed to the gaming servers 1610 for processing and executing the wagering game. In some embodiments, this may involve providing specific graphical display information for the display 1622 as well as game outcomes.

As another example, the client may comprise an executable file rather than a script. The client may do more local processing than does a script driver, such as calculating where to show what game symbols upon receiving a game outcome from the game service 1616 through user interaction service 1612. In some embodiments, portions of an asset service 1614 may be loaded onto the client and may be used by the client in processing and updating graphical displays. Some form of data protection, such as end-to-end encryption, may be used when data is transported over the network 1630. The network 1630 may be any network, such as, for example, the Internet or a local area network.

The gaming servers 1610 may include an asset service 1614, which may host various media assets (e.g., text, audio, video, and image files) to send to the user device 1620 for presenting the various wagering games to the end user. In other words, the assets presented to the end user may be stored separately from the user device 1620. For example, the user device 1620 requests the assets appropriate for the game played by the user; as another example, especially relating to thin clients, just those assets that are needed for a particular display event will be sent by the gaming servers 1610, including as few as one asset. The user device 1620 may call a function defined at the user interaction service 1612 or asset service 1614, which may determine which assets are to be delivered to the user device 1620 as well as how the assets are to be presented by the user device 1620 to the end user. Different assets may correspond to the various user devices 1620 and their clients that may have access to the game service 1616 and to different variations of wagering games.

The gaming servers 1610 may include the game service 1616, which may be programmed to administer wagering games and determine game play outcomes to provide to the user interaction service 1612 for transmission to the user device 1620. For example, the game service 1616 may include game rules for one or more wagering games, such that the game service 1616 controls some or all of the game flow for a selected wagering game as well as the determined game outcomes. The game service 1616 may include pay tables and other game logic. The game service 1616 may perform random number generation for determining random game elements of the wagering game. In one embodiment, the game service 1616 may be separated from the user interaction service 1612 by a firewall or other method of preventing unauthorized access to the game service 1612 by the general members of the network 1630.

The user device 1620 may present a gaming interface to the player and communicate the user interaction from the user input device 1624 to the gaming servers 1610. The user device 1620 may be any electronic system capable of displaying gaming information, receiving user input, and communicating the user input to the gaming servers 1610. For example, the user device 1620 may be a desktop computer, a laptop, a tablet computer, a set-top box, a mobile device (e.g., a smartphone), a kiosk, a terminal, or another computing device. As a specific, nonlimiting example, the user device 1620 operating the client may be an interactive electronic gaming system 1300. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 1610. The client may be illustrated within a casino webpage (or other interface) indicating that the client is embedded into a webpage, which is supported by a web browser executing on the user device 1620.

In some embodiments, components of the gaming system 1600 may be operated by different entities. For example, the user device 1620 may be operated by a third party, such as a casino or an individual, that links to the gaming servers 1610, which may be operated, for example, by a wagering game service provider. Therefore, in some embodiments, the user device 1620 and client may be operated by a different administrator than the operator of the game service 1616. In other words, the user device 1620 may be part of a third-party system that does not administer or otherwise control the gaming servers 1610 or game service 1616. In other embodiments, the user interaction service 1612 and asset service 1614 may be operated by a third-party system. For example, a gaming entity (e.g., a casino) may operate the user interaction service 1612, user device 1620, or combination thereof to provide its customers access to game content managed by a different entity that may control the game service 1616, amongst other functionality. In still other embodiments, all functions may be operated by the same administrator. For example, a gaming entity (e.g., a casino) may elect to perform each of these functions in-house, such as providing access to the user device 1620, delivering the actual game content, and administering the gaming system 1600.

The gaming servers 1610 may communicate with one or more external account servers 1632 (also referred to herein as an account service 1632), optionally through another firewall. For example, the gaming servers 1610 may not directly accept wagers or issue payouts. That is, the gaming servers 1610 may facilitate online casino gaming but may not be part of self-contained online casino itself. Another entity (e.g., a casino or any account holder or financial system of record) may operate and maintain its external account service 1632 to accept bets and make payout distributions. The gaming servers 1610 may communicate with the account service 1632 to verify the existence of funds for wagering and to instruct the account service 1632 to execute debits and credits. As another example, the gaming servers 1610 may directly accept bets and make payout distributions, such as in the case where an administrator of the gaming servers 1610 operates as a casino.

Additional features may be supported by the gaming servers 1610, such as hacking and cheating detection, data storage and archival, metrics generation, messages generation, output formatting for different end user devices, as well as other features and operations.

Figure 12:
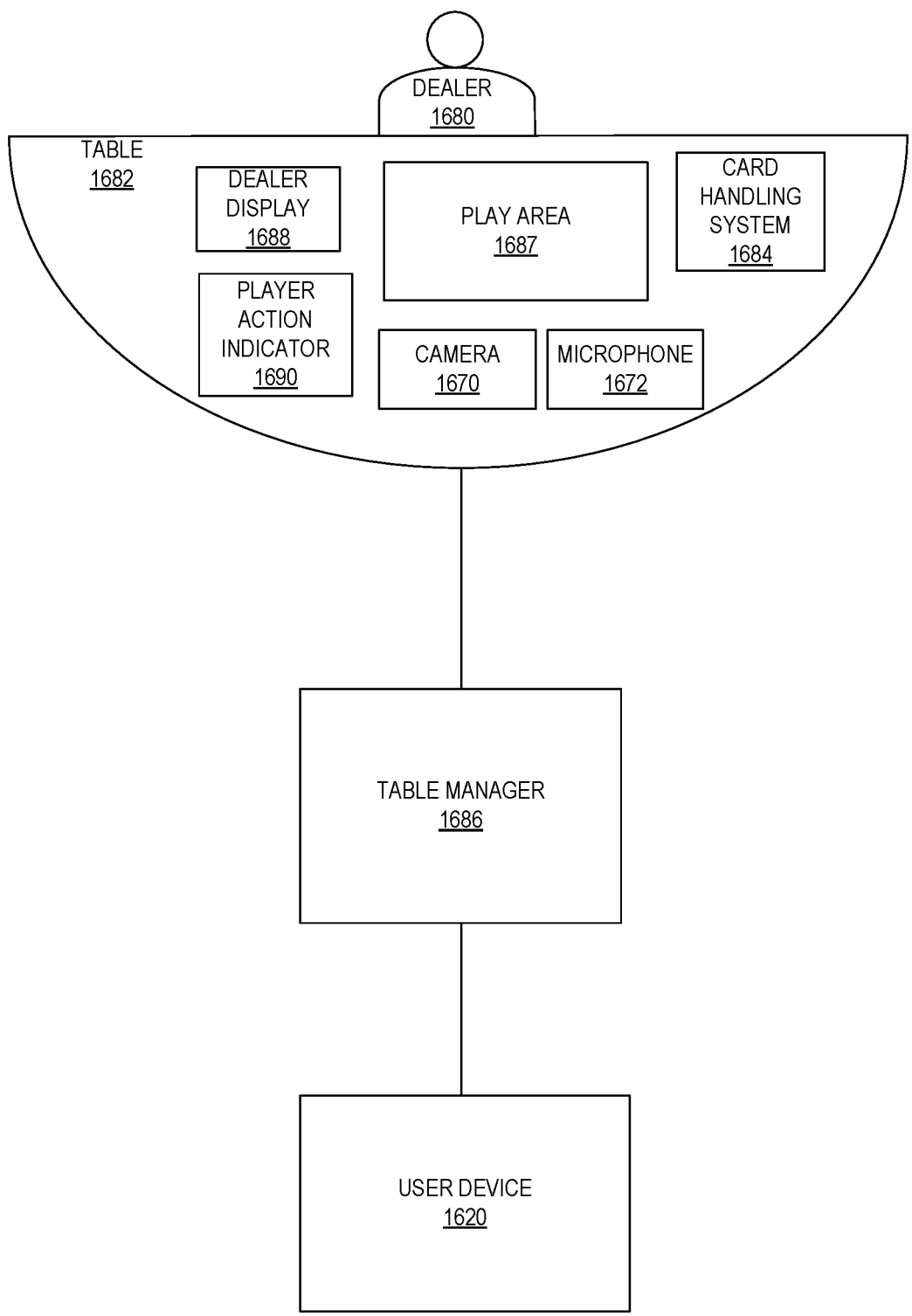
FIG. 12 is a schematic block diagram of a gaming system for implementing embodiments of wagering games including a live dealer feed.

FIG. 12 is a schematic block diagram of a table 1682 for implementing wagering games including a live dealer video feed. Features of the gaming system 1600 (see FIG. 11) described above in connection with FIG. 11 may be utilized in connection with this embodiment, except as further described. Rather than cards being determined by computerized random processes, physical cards (e.g., from a standard, 52-card deck of playing cards) may be dealt by a live dealer 1680 at a table 1682 from a card-handling system 1684 located in a studio or on a casino floor. A table manager 1686 may assist the dealer 1680 in facilitating play of the game by transmitting a live video feed of the dealer's actions to the user device 1620 and transmitting remote player elections to the dealer 1680. As described above, the table manager 1686 may act as or communicate with a gaming system 1600 (see FIG. 11) (e.g., acting as the gaming system 1600 (see FIG. 11) itself or as an intermediate client interposed between and operationally connected to the user device 1620 and the gaming system 1600 (see FIG. 11)) to provide gaming at the table 1682 to users of the gaming system 1600 (see FIG. 11). Thus, the table manager 1686 may communicate with the user device 1620 through a network 1630 (see FIG. 11), and may be a part of a larger online casino, or may be operated as a separate system facilitating game play. In various embodiments, each table 1682 may be managed by an individual table manager 1686 constituting a gaming device, which may receive and process information relating to that table. For simplicity of description, these functions are described as being performed by the table manager 1686, though certain functions may be performed by an intermediary gaming system 1600 (see FIG. 11), such as the one shown and described in connection with FIG. 11. In some embodiments, the gaming system 1600 (see FIG. 11) may match remotely located players to tables 1682 and facilitate transfer of information between user devices 1620 and tables 1682, such as wagering amounts and player option elections, without managing gameplay at individual tables. In other embodiments, functions of the table manager 1686 may be incorporated into a gaming system 1600 (see FIG. 11).

The table 1682 includes a camera 1670 and optionally a microphone 1672 to capture video and audio feeds relating to the table 1682. The camera 1670 may be trained on the live dealer 1680, play area 1687, and card-handling system 1684. As the game is administered by the live dealer 1680, the video feed captured by the camera 1670 may be shown to the player remotely using the user device 1620, and any audio captured by the microphone 1672 may be played to the player remotely using the user device 1620. In some embodiments, the user device 1620 may also include a camera, microphone, or both, which may also capture feeds to be shared with the dealer 1680 and other players. In some embodiments, the camera 1670 may be trained to capture images of the card faces, chips, and chip stacks on the surface of the gaming table. Known image extraction techniques may be used to obtain card count and card rank and suit information from the card images.

Card and wager data in some embodiments may be used by the table manager 1686 to determine game outcome. The data extracted from the camera 1670 may be used to confirm the card data obtained from the card-handling system 1684, to determine a player position that received a card, and for general security monitoring purposes, such as detecting player or dealer card switching, for example. Examples of card data include, for example, suit and rank information of a card, suit and rank information of each card in a hand, rank information of a hand, and rank information of every hand in a round of play.

The live video feed permits the dealer to show cards dealt by the card-handling system 1684 and play the game as though the player were at a gaming table, playing with other players in a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

The card-handling system 1684 may be as shown and was described previously. The play area 1686 depicts player layouts for playing the game. As determined by the rules of the game, the player at the user device 1620 may be presented options for responding to an event in the game using a client as described with reference to FIG. 11.

Player elections may be transmitted to the table manager 1686, which may display player elections to the dealer 1680 using a dealer display 1688 and player action indicator 1690 on the table 1682. For example, the dealer display 1688 may display information regarding where to deal the next card or which player position is responsible for the next action.

In some embodiments, the table manager 1686 may receive card information from the card-handling system 1684 to identify cards dealt by the card-handling system 1684. For example, the card-handling system 1684 may include a card reader to determine card information from the cards. The card information may include the rank and suit of each dealt card and hand information.

The table manager 1686 may apply game rules to the card information, along with the accepted player decisions, to determine gameplay events and wager results. Alternatively, the wager results may be determined by the dealer 1680 and input to the table manager 1686, which may be used to confirm automatically determined results by the gaming system.

Card and wager data in some embodiments may be used by the table manager 1686 to determine game outcome. The data extracted from the camera 1670 may be used to confirm the card data obtained from the card-handling system 1684, to determine a player position that received a card, and for general security monitoring purposes, such as detecting player or dealer card switching, for example.

The live video feed permits the dealer to show cards dealt by the card-handling system 1684 and play the game as though the player were at a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

Figure 13:
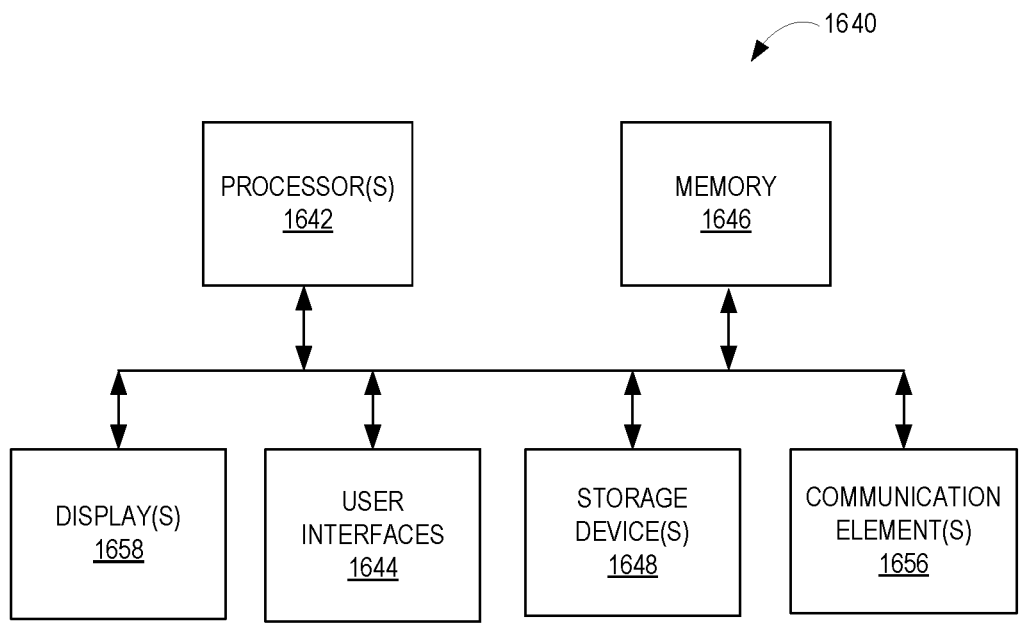
FIG. 13 is a block diagram of a computer for acting as a gaming system for implementing embodiments of wagering games in accordance with this disclosure.

FIG. 13 is a simplified block diagram showing elements of computing devices that may be used in systems and apparatuses of this disclosure. A computing system 1640 may be a user-type computer, a file server, a computer server, a notebook computer, a tablet, a handheld device, a mobile device, or other similar computer system for executing software. The computing system 1640 may be configured to execute software programs containing computing instructions and may include one or more processors 1642, memory 1646, one or more displays 1658, one or more user interface elements 1644, one or more communication elements 1656, and one or more storage devices 1648 (also referred to herein simply as storage 1648).

The processors 1642 may be configured to execute a wide variety of operating systems and applications including the computing instructions for administering wagering games of the present disclosure.

The processors 1642 may be configured as a general-purpose processor such as a microprocessor, but in the alternative, the general-purpose processor may be any processor, controller, microcontroller, or state machine suitable for carrying out processes of the present disclosure. The processor 1642 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The memory 1646 may be used to hold computing instructions, data, and other information for performing a wide variety of tasks including administering wagering games of the present disclosure. By way of example, and not limitation, the memory 1646 may include Synchronous Random Access Memory (SRAM), Dynamic RAM (DRAM), Read-Only Memory (ROM), Flash memory, and the like.

The display 1658 may be a wide variety of displays such as, for example, light-emitting diode displays, liquid crystal displays, cathode ray tubes, and the like. In addition, the display 1658 may be configured with a touch-screen feature for accepting user input as a user interface element 1644.

As nonlimiting examples, the user interface elements 1644 may include elements such as displays, keyboards, push-buttons, mice, joysticks, haptic devices, microphones, speakers, cameras, and touchscreens.

As nonlimiting examples, the communication elements 1656 may be configured for communicating with other devices or communication networks. As nonlimiting examples, the communication elements 1656 may include elements for communicating on wired and wireless communication media, such as for example, serial ports, parallel ports, Ethernet connections, universal serial bus (USB) connections, IEEE 1394 ("firewire") connections, THUNDERBOLT® connections, BLUETOOTH® wireless networks, ZigBee wireless networks, 802.11 type wireless networks, cellular telephone/data networks, fiber optic networks and other suitable communication interfaces and protocols.

The storage 1648 may be used for storing relatively large amounts of nonvolatile information for use in the computing system 1640 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 1640 may be configured in many different ways with different types of interconnecting buses between the various elements. Moreover, the various elements may be subdivided physically, functionally, or a combination thereof. As one nonlimiting example, the memory 1646 may be divided into cache memory, graphics memory, and main memory. Each of these memories may communicate directly or indirectly with the one or more processors 1642 on separate buses, partially combined buses, or a common bus.

As a specific, nonlimiting example, various methods and features of the present disclosure may be implemented in a mobile, remote, or mobile and remote environment over one or more of Internet, cellular communication (e.g., Broadband), near field communication networks and other communication networks referred to collectively herein as an iGaming environment. The iGaming environment may be accessed through social media environments such as FACEBOOK® and the like. DragonPlay Ltd, acquired by Bally Technologies Inc., provides an example of a platform to provide games to user devices, such as cellular telephones and other devices utilizing ANDROID®, iPHONE® and FACEBOOK® platforms. Where permitted by jurisdiction, the iGaming environment can include pay-to-play (P2P) gaming where a player, from their device, can make value based wagers and receive value based awards. Where P2P is not permitted the features can be expressed as entertainment only gaming where players wager virtual credits having no value or risk no wager whatsoever such as playing a promotion game or feature.

Figure 14:
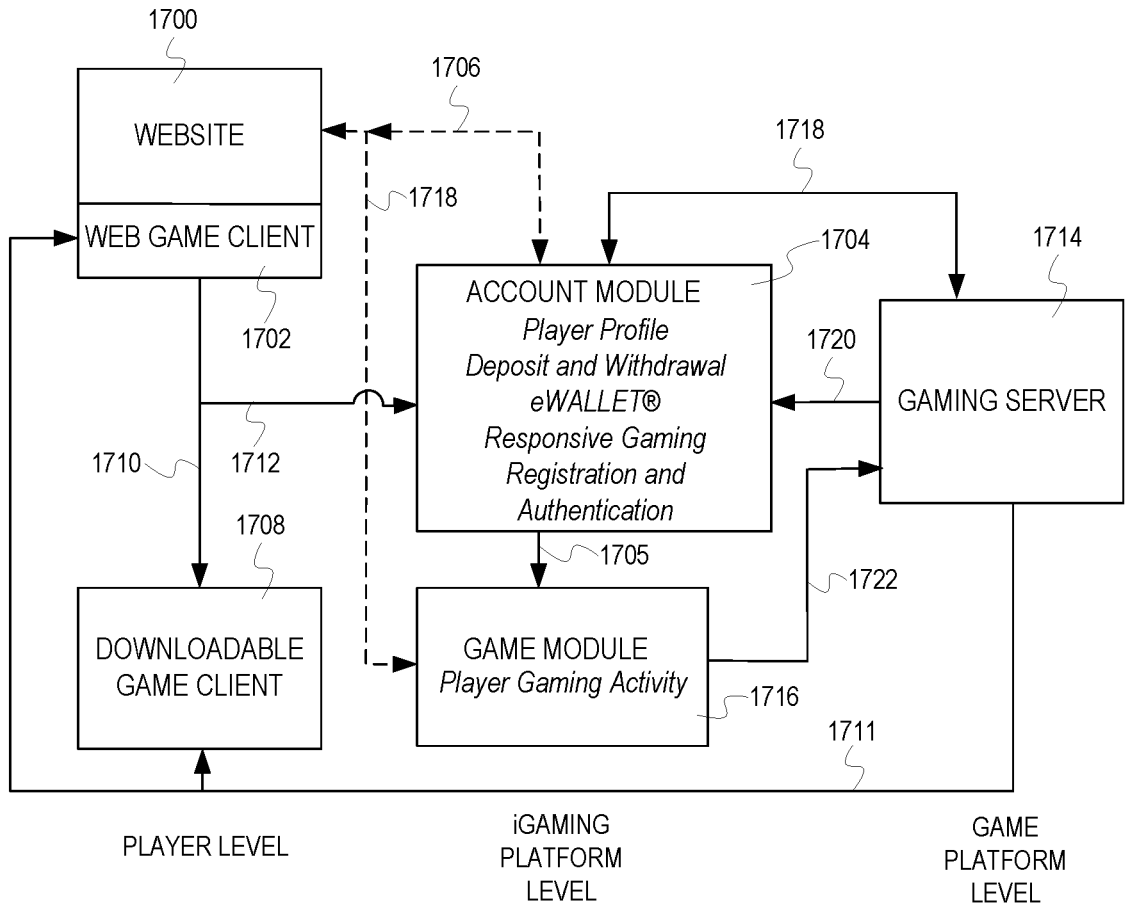
FIG. 14 illustrates an embodiment of data flows between various applications/services for supporting the game, feature or utility of the present disclosure for mobile/interactive gaming.

FIG. 14 illustrates an illustrative embodiment of information flows in an iGaming environment. At a player level, the player or user accesses a site hosting the activity such as a website 1700. The website 1700 may functionally provide a web game client 1702. The web game client 1702 may be, for example, represented by a game client 1708 downloadable at information flow 1710, which may process applets transmitted from a gaming server 1714 at information flow 1711 for rendering and processing game play at a player's remote device. Where the game is a P2P game, the gaming server 1714 may process value-based wagers (e.g., money wagers) and randomly generate an outcome for rendition at the player's device. In some embodiments, the web game client 1702 may access a local memory store to drive the graphic display at the player's device. In other embodiments, all or a portion of the game graphics may be streamed to the player's device with the web game client 1702 enabling player interaction and display of game features and outcomes at the player's device.

The website 1700 may access a player-centric, iGaming-platform-level account module 1704 at information flow 1706 for the player to establish and confirm credentials for play and, where permitted, access an account (e.g., an eWallet) for wagering. The account module 1704 may include or access data related to the player's profile (e.g., player-centric information desired to be retained and tracked by the host), the player's electronic account, deposit, and withdrawal records, registration and authentication information, such as username and password, name and address information, date of birth, a copy of a government issued identification document, such as a driver's license or passport, and biometric identification criteria, such as fingerprint or facial recognition data, and a responsible gaming module containing information, such as self-imposed or jurisdictionally imposed gaming restraints, such as loss limits, daily limits and duration limits. The account module 1704 may also contain and enforce geo-location limits, such as geographic areas where the player may play P2P games, user device IP address confirmation, and the like.

The account module 1704 communicates at information flow 1705 with a game module 1716 to complete log-ins, registrations, and other activities. The game module 1716 may also store or access a player's gaming history, such as player tracking and loyalty club account information. The game module 1716 may provide static web pages to the player's device from the game module 1716 through information flow 1718, whereas, as stated above, the live game content may be provided from the gaming server 1714 to the web game client through information flow 1711.

The gaming server 1714 may be configured to provide interaction between the game and the player, such as receiving wager information, game selection, inter-game player selections or choices to play a game to its conclusion, and the random selection of game outcomes and graphics packages, which, alone or in conjunction with the downloadable game client 1708/web game client 1702 and game module 1716, provide for the display of game graphics and player interactive interfaces. At information flow 1718, player account and log-in information may be provided to the gaming server 1714 from the account module 1704 to enable gaming. Information flow 1720 provides wager/credit information between the account module 1704 and gaming server 1714 for the play of the game and may display credits and eWallet availability. Information flow 1722 may provide player tracking information for the gaming server 1714 for tracking the player's play. The tracking of play may be used for purposes of providing loyalty rewards to a player, determining preferences, and the like.

All or portions of the features of FIG. 14 may be supported by servers and databases located remotely from a player's mobile device and may be hosted or sponsored by regulated gaming entity for P2P gaming or, where P2P is not permitted, for entertainment only play.

In some embodiments, wagering games may be administered in an at least partially player-pooled format, with payouts on pooled wagers being paid from a pot to players and losses on wagers being collected into the pot and eventually distributed to one or more players. Such player-pooled embodiments may include a player-pooled progressive embodiment, in which a pot is eventually distributed when a predetermined progressive-winning hand combination or composition is dealt. Player-pooled embodiments may also include a dividend refund embodiment, in which at least a portion of the pot is eventually distributed in the form of a refund distributed, e.g., pro-rata, to the players who contributed to the pot.

In some player-pooled embodiments, the game administrator may not obtain profits from chance-based events occurring in the wagering games that result in lost wagers. Instead, lost wagers may be redistributed back to the players. To profit from the wagering game, the game administrator may retain a commission, such as, for example, a player entrance fee or a rake taken on wagers, such that the amount obtained by the game administrator in exchange for hosting the wagering game is limited to the commission and is not based on the chance events occurring in the wagering game itself. The game administrator may also charge a rent of flat fee to participate.

It is noted that the methods described herein can be played with any number of standard decks of 52 cards (e.g., 1 deck to 10 decks). A standard deck is a collection of cards comprising an Ace, two, three, four, five, six, seven, eight, nine, ten, jack, queen, king, for each of four suits (comprising spades, diamonds, clubs, hearts) totaling 52 cards. Cards can be shuffled or a continuous shuffling machine (CSM) can be used. A standard deck of 52 cards can be used, as well as other kinds of decks, such as Spanish decks, decks with wild cards, etc. The operations described herein can be performed in any sensible order. Furthermore, numerous different variants of house rules can be applied.

Note that in the embodiments played using computers (a processor/processing unit), "virtual deck(s)" of cards are used instead of physical decks. A virtual deck is an electronic data structure used to represent a physical deck of cards which uses electronic representations for each respective card in the deck. In some embodiments, a virtual card is presented (e.g., displayed on an electronic output device using computer graphics, projected onto a surface of a physical table using a video projector, etc.) and is presented to mimic a real life image of that card.

Methods described herein can also be played on a physical table using physical cards and physical chips used to place wagers. Such physical chips can be directly redeemable for cash. When a player wins (dealer loses) the player's wager, the dealer will pay that player a respective payout amount. When a player loses (dealer wins) the player's wager, the dealer will take (collect) that wager from the player and typically place those chips in the dealer's chip rack. All rules, embodiments, features, etc. of a game being played can be communicated to the player (e.g., verbally or on a written rule card) before the game begins.

Initial cash deposits can be made into the electronic gaming machine which converts cash into electronic credits.

Wagers can be placed in the form of electronic credits, which can be cashed out for real coins or a ticket (e.g., ticket-in-ticket-out) which can be redeemed at a casino cashier or kiosk for real cash and/or coins.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. An apparatus comprising:
   a chip tray having a plurality of light sensors, wherein the plurality of light sensors are positioned inside a column of the chip tray; and
   a tracking controller configured to perform operations that cause the apparatus to:
   detect a level of ambient light at each of the plurality of light sensors;
   determine, in response to detection of the level of ambient light at each of the plurality of light sensors, a number of gaming chips placed inside the column;
   identify, by a neural network model via electronic analysis of image data of the gaming chips inside the column, a pattern on the edge of at least a relative majority of the gaming chips,
   determine, based on the pattern, a chip denomination value associated with the column; and
   compute, in response to multiplication of the number of the gaming chips by the chip denomination value, a chip-column value.

2. The apparatus of claim 1, wherein the tracking controller configured to detect the level of ambient light at each of the plurality of sensors is further configured to perform operations that cause the apparatus to:
   detect a first level of the ambient light at a first light sensor that is not covered by one of the gaming chips;
   compare the first level of ambient light detected at the first light sensor to a second level of ambient light detected at a second light sensor, wherein the second light sensor is one the plurality of light sensors; and
   determine, based on a difference in the detected first level of ambient light and the detected second level of ambient light, that one of the gaming chips is covering the second light sensor.

3. The apparatus of claim 2, wherein the tracking controller is configured to compute the chip-column value based, at least in part, on determination that the one of the gaming chips is covering the second light sensor.

4. The apparatus of claim 1, wherein the tracking controller is configured to perform operations that cause the apparatus to determine the chip denomination value associated with the gaming chips placed inside the column in response to determination, via analysis of the image data, that the at least a relative majority of the gaming chips in the column have the pattern.

5. The apparatus of claim 1, wherein the tracking controller is further configured to perform operations that cause the apparatus to;
   determine that at least one of the gaming chips in the column has an additional pattern different from the pattern; and
   automatically indicate that the at least one of the gaming chips has the additional pattern different from the pattern.

6. The apparatus of claim 1, wherein the plurality of light sensors are positioned vertically along a curved, semi-circular wall of the column, wherein the plurality of light sensors are positioned below holes formed into the wall, and wherein one or more transparent windows cover the holes.

7. The apparatus of claim 1, wherein each of the plurality of light sensors are vertically spaced apart from each other in the column by a distance equivalent to a thickness of one of the gaming chips.

8. The apparatus of claim 1, wherein the tracking controller is further configured to automatically indicate the chip-column value via one or more electronic devices communicatively coupled to the chip tray.

9. The apparatus of claim 1, wherein the chip tray comprises a plurality of circuits, wherein each of the plurality of circuits comprises at least one of the plurality of the light sensors, at least one resistor, and at least one comparator.

10. The apparatus of claim 9, wherein each of the plurality of circuits is communicatively coupled, via the at least one comparator, to a microcontroller, and wherein the microcontroller is connected, via a bus, to a plurality of additional microcontrollers associated with a plurality of additional columns of the chip tray.

11. The apparatus of claim 10, wherein the tracking controller is further configured to perform operations that cause the apparatus to:
   compute additional chip-column values for the plurality of additional columns; and
   add the column value to the additional chip-column values, wherein a sum of the chip-column value and the additional chip-column values equates to a total chip-tray value.

12. A method of tracking gaming chips comprising:
   detecting, via a tracking controller, a level of ambient light at each of a plurality of light sensors of a chip tray, wherein the plurality of light sensors are positioned inside a column of the chip tray;
   determining, via the tracking controller in response to the detecting the level of ambient light at each of the plurality of light sensors, a number of gaming chips inside the column;

identifying, via electronic analysis of image data of the chip tray by a machine learning model, a pattern on the edge of at least a relative majority of the number of gaming chips, determining, based on the pattern, a chip denomination value associated with the column; and computing, via the tracking controller in response to multiplication of the number of gaming chips by the chip denomination value, a chip-column value for the column.

13. The method of claim 12, wherein detecting the level of ambient light at each of the plurality of light sensors comprises:

detecting, by the tracking controller, a first level of the ambient light at a threshold light sensor, wherein the threshold light sensor is not covered by one of the number of gaming chips;

comparing, by the tracking controller, the first level of ambient light at the threshold light sensor to a second level of ambient light detected a second light sensor, wherein the second light sensor is one of the plurality of light sensors; and determining, by the tracking controller based on a difference in the detected first level of ambient light and the detected second level of ambient light, that one of the number of gaming chips is covering the second light sensor.

14. The method of claim 13, wherein the computing the chip-column value is based, at least in part, on determining that the one of the number of gaming chips is covering the second light sensor.

15. The method of claim 12 further comprising:

determining, by the tracking controller, that at least one of the number of gaming chips has an additional pattern different from the pattern; and automatically indicating, by the tracking controller, that the at least one of the number of gaming chips is misplaced within the chip tray in response to the determining that the at least one of the gaming chips has the additional pattern different from the pattern.

16. The method of claim 12 further comprising automatically indicating, by the tracking controller, the chip-column value via one or more electronic devices communicatively coupled to the chip tray.

17. The method of claim 12, wherein the determining, via the tracking controller in response to the detecting the level of ambient light at each of the plurality of light sensors, the number of gaming chips inside the column comprises determining, via the tracking controller in response to comparing the detected level of ambient light at each of the plurality of light sensors to an ambient light threshold, the number of gaming chips inside the column.

18. One or more non-transitory machine-readable mediums having instructions stored thereon, which when executed by a set of one or more processors cause a gaming system to perform operations comprising:

identifying, via electronic analysis by a machine learning model of image data of gaming chips positioned inside a column of a chip tray, a pattern on the edge of the gaming chips;

determining, in response to identifying the pattern on the edge of the gaming chips, a chip denomination value associated with the column;

detecting a level of ambient light at each of a plurality of light sensors positioned inside the column;

determining, in response to detection of the level of ambient light at each of the plurality of light sensors, a number of the gaming chips inside the column; and computing, in response to multiplication of the number of the gaming chips by the chip denomination value, a chip-column value.

19. The one or more non-transitory machine-readable mediums of claim 18, wherein the operations of detecting the level of ambient light at each of the plurality of light sensors positioned inside the column comprises detecting a level of blockage of the ambient light at each of a plurality of light sensors positioned inside the column, and determining, in response to detection of the level of blockage of the ambient light at each of the plurality of light sensors, the number of the gaming chips inside the column.

* * * * *